(12) United States Patent
Yamada

(10) Patent No.: US 9,290,149 B2
(45) Date of Patent: Mar. 22, 2016

(54) AIRBAG APPARATUS FOR A FRONT PASSENGER SEAT

(71) Applicant: TOYODA GOSEI CO., LTD., Kiyosu-shi, Aichi-ken (JP)

(72) Inventor: Ikuo Yamada, Kiyosu (JP)

(73) Assignee: TOYODA GOSEI CO., LTD., Aichi-pref. (JP)

(*) Notice: Subject to any disclaimer, the term of this patent is extended or adjusted under 35 U.S.C. 154(b) by 0 days.

(21) Appl. No.: 14/300,343

(22) Filed: Jun. 10, 2014

(65) Prior Publication Data

US 2015/0001836 A1    Jan. 1, 2015

(30) Foreign Application Priority Data

Jun. 28, 2013   (JP) .................................. 2013-136654

(51) Int. Cl.
*B60R 21/231*    (2011.01)
*B60R 21/2338*   (2011.01)

(52) U.S. Cl.
CPC .......... *B60R 21/231* (2013.01); *B60R 21/2338* (2013.01); *B60R 2021/23382* (2013.01)

(58) Field of Classification Search
CPC .................. B60R 21/231; B60R 2021/23382; B60R 2021/23576; B60R 2021/23571; B60R 21/2338; B60R 21/205
See application file for complete search history.

(56) References Cited

U.S. PATENT DOCUMENTS

| | | | |
|---|---|---|---|
| 2006/0049618 A1 | 3/2006 | Bito | |
| 2007/0252365 A1* | 11/2007 | Urushibata et al. | 280/729 |
| 2008/0054613 A1 | 3/2008 | Narimoto et al. | |
| 2009/0058056 A1* | 3/2009 | Yamada | 280/732 |
| 2010/0117338 A1* | 5/2010 | Yamada et al. | 280/728.2 |
| 2011/0062693 A1* | 3/2011 | Williams | 280/743.2 |
| 2013/0320656 A1* | 12/2013 | Yamada et al. | 280/743.2 |

FOREIGN PATENT DOCUMENTS

| | | | |
|---|---|---|---|
| DE | 102008016460 A1 | * | 10/2008 |
| JP | H09-76864 A | | 3/1997 |
| JP | 2006-103654 A | | 4/2006 |
| JP | 2008-062710 A | | 3/2008 |
| JP | 2008-254500 A | | 10/2008 |

OTHER PUBLICATIONS

Yamada et al., Airbag für einen Beifahrersitz, Oct. 9, 2008, Germany, DE 10 2008 016 460 A1, Machine Translation of Description.*
Yamada et al., Airbag für einen Beifahrersitz, Oct. 9, 2008, Germany, DE 10 2008 016 460 A1, English Abstract.*
Office Action Issued Oct. 13, 2015 in the corresponding JP application No. 2013-136654 (with English translation).

* cited by examiner

*Primary Examiner* — James English
(74) *Attorney, Agent, or Firm* — Posz Law Group, PLC

(57) ABSTRACT

An airbag apparatus for a front passenger seat includes an airbag inflatable into a generally square conical contour whose top is deployable at the front end. The airbag is mounted on a case together with an inflator by the periphery of a gas inlet port which is located proximate the front end of the airbag. The airbag includes in a passenger side wall a recessed area that is sunken forward and extends vertically generally at airbag inflation. A seam that joints peripheral edges of a base material of the circumferential wall together extends forward from the recessed area. The seam is slanted off a front and rear direction such that the front end of the seam is directed toward either left or right when the airbag at full inflation is viewed from an up and down direction.

8 Claims, 18 Drawing Sheets

AIRBAG APPARATUS FOR A FRONT PASSENGER SEAT

CROSS REFERENCE TO RELATED APPLICATIONS

The Present application claims priority from Japanese Patent Application No. 2013-136654 of Yamada, filed on Jun. 28, 2013, the disclosure of which is hereby incorporated into the present application by reference.

BACKGROUND OF THE INVENTION

1. Field of the Invention

The present invention relates to an airbag apparatus for a front passenger seat adapted to be mounted on an instrument panel located in front of a front passenger seat of a vehicle. Particularly, the invention relates to an airbag apparatus for a front passenger seat that includes an airbag, an inflator for feeding an inflation gas to the airbag and a case for housing the airbag and the inflator.

2. Description of Related Art

As disclosed in JP2006-103654, JP2008-62710 and JP2008-254500, a known airbag apparatus for a front passenger seat includes an airbag that is deployable into a generally square conical contour whose front end is the top of the square cone, and includes a passenger side wall which is deployable at the rear end generally vertically and toward a front passenger seat, a circumferential wall which extends forward from the peripheral edge of the passenger side wall while tapering and converges at the front end, a gas inlet port located proximate the front end and at a generally center in a left and right direction of the airbag as inflated for introducing an inflation gas, and a recessed area that is sunken forward and extends vertically generally at the center in a left and right direction of the passenger side wall. The conventional airbag is formed by jointing peripheral edges of base materials, thus the circumferential wall has a seam that extends forward from the recessed area in the passenger side wall. This airbag is folded up to be reduced in size and mounted on the case by the peripheral edge of the gas inlet port, together with the inflator, and housed in the case.

Because of the seam that extends generally in a front and rear direction at the center in a left and right direction of the circumferential wall, the airbag as folded up has a bulky portion formed by multiple layers of the seam. Especially, the airbag apparatuses for a front passenger seat disclosed in JP2006-103654 and JP2008-254500 have another seam of base materials on the passenger side wall as well, respectively. The seam constitutes the leading end (or bottom) of the recessed area. Accordingly, the airbag has the seams over a generally entire circumference in a front and rear direction except the peripheral edge of the gas inlet port. Together with seam allowances comprised of the base materials, the seams form a bulky portion at the center in a left and right direction when folded up in layers when the airbag is folded up to be housed in the case. This bulky portion is located adjacent to the inflator in a case when the airbag and inflator are mounted on a case, which makes it difficult to store the airbag and inflator in a limited space of a case.

Thus, the conventional airbag apparatuses had a room for improvement in mounting in a limited space.

SUMMARY OF THE INVENTION

An object of the present invention is to provide an airbag apparatus for a front passenger seat that is capable of being mounted in a limited space.

The object of the invention will be achieved by an airbag apparatus for a front passenger seat adapted to be mounted on an instrument panel of a vehicle in front of a front passenger seat, the airbag apparatus including:

an airbag inflatable into a generally square conical contour whose top is at a front end of the airbag, the airbag including a passenger side wall that is deployable generally vertically toward a front passenger seat at a rear end of the airbag; a circumferential wall that extends forward from a peripheral edge of the passenger side wall while tapering and converges at the front end; a gas inlet port that is located proximate the front end of and generally at a center in a left and right direction of the airbag at inflation for introducing an inflation gas; and a recessed area that is sunken forward and extends vertically generally at a center in a left and right direction of the passenger side wall at airbag inflation, the airbag being mounted on a case by a periphery of the gas inlet port together with an inflator for feeding an inflation gas to the airbag, and being stored in the case while being folded up and reduced in size in front-and-rear and left-and-right directions; and a seam that joints peripheral edges of a base material of the circumferential wall together to form the circumferential wall, the seam extending forward from the recessed area of the passenger side wall, the seam being slanted off a front and rear direction such that a front end of the seam is directed toward either left or right when the airbag at full inflation is viewed from an up and down direction.

With the airbag apparatus according to the invention, the seam that extends through the circumferential wall forward from the recessed area of the passenger side wall is slanted off a front and rear direction. With this configuration, the seam will be prevented from overlapping itself at the center in a left and rear direction of the airbag when the airbag is folded up to be reduced in width in a front and rear direction. Although the seam is accompanied by seam allowances comprised of hems of the base material and the seam allowances extend continuously in a front and rear direction, this configuration will prevent a region at the center in a left and right direction of the airbag from being bulky when the airbag is folded up. Thus the airbag as folded up will be compact in size and fit in a case with less height, and the airbag apparatus can be mounted in a limited space.

Therefore, the airbag apparatus for a front passenger seat of the invention is capable of being mounted in a limited space.

In the airbag apparatus for a front passenger seat of the invention, it is further desired that:

the circumferential wall is comprised of two of the base materials that are formed in such a manner as to split the circumferential wall into left and right; and the seam includes an upper seam and a lower seam that are both slanted off a front and rear direction such that a front end of the upper seam and a front end of the lower seam face away and separately located from each other in a left and right direction when the airbag at full inflation is viewed from an up and down direction.

With this configuration, although the upper seam and the lower seam are arranged continuously on the upper side and lower side of the circumferential wall, respectively, the airbag as is folded up has a limited region where the upper seam and lower seam overlap each other. Consequently, this configuration will make the region at the center in a left and right direction of the airbag as less bulky as possible when the airbag is folded up. In the airbag apparatus of the invention, moreover, the circumferential wall is formed of two base materials. With this configuration, a better fabric yield will be obtained than an instance where the circumferential wall is comprised of only one base material, and a manufacturing cost of the airbag will be suppressed.

DESCRIPTION OF PREFERRED EMBODIMENTS

Preferred embodiments of the present invention are described below with reference to the accompanying drawings. However, the invention is not limited to the embodiments disclosed herein. All modifications within the appended claims and equivalents relative thereto are intended to be encompassed in the scope of the claims.

Figure 1:
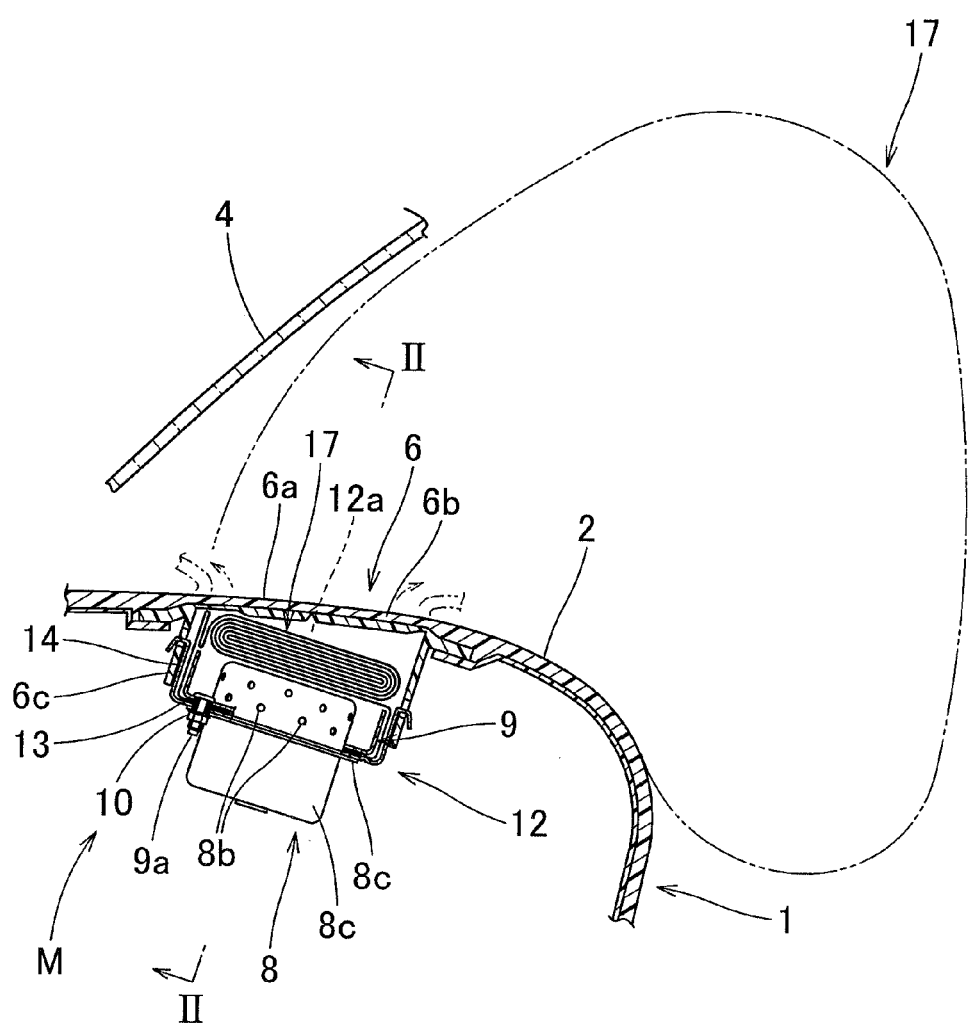
FIG. 1 is a vertical section of an airbag apparatus for a front passenger seat embodying the invention as mounted on a vehicle.
Figure 2:
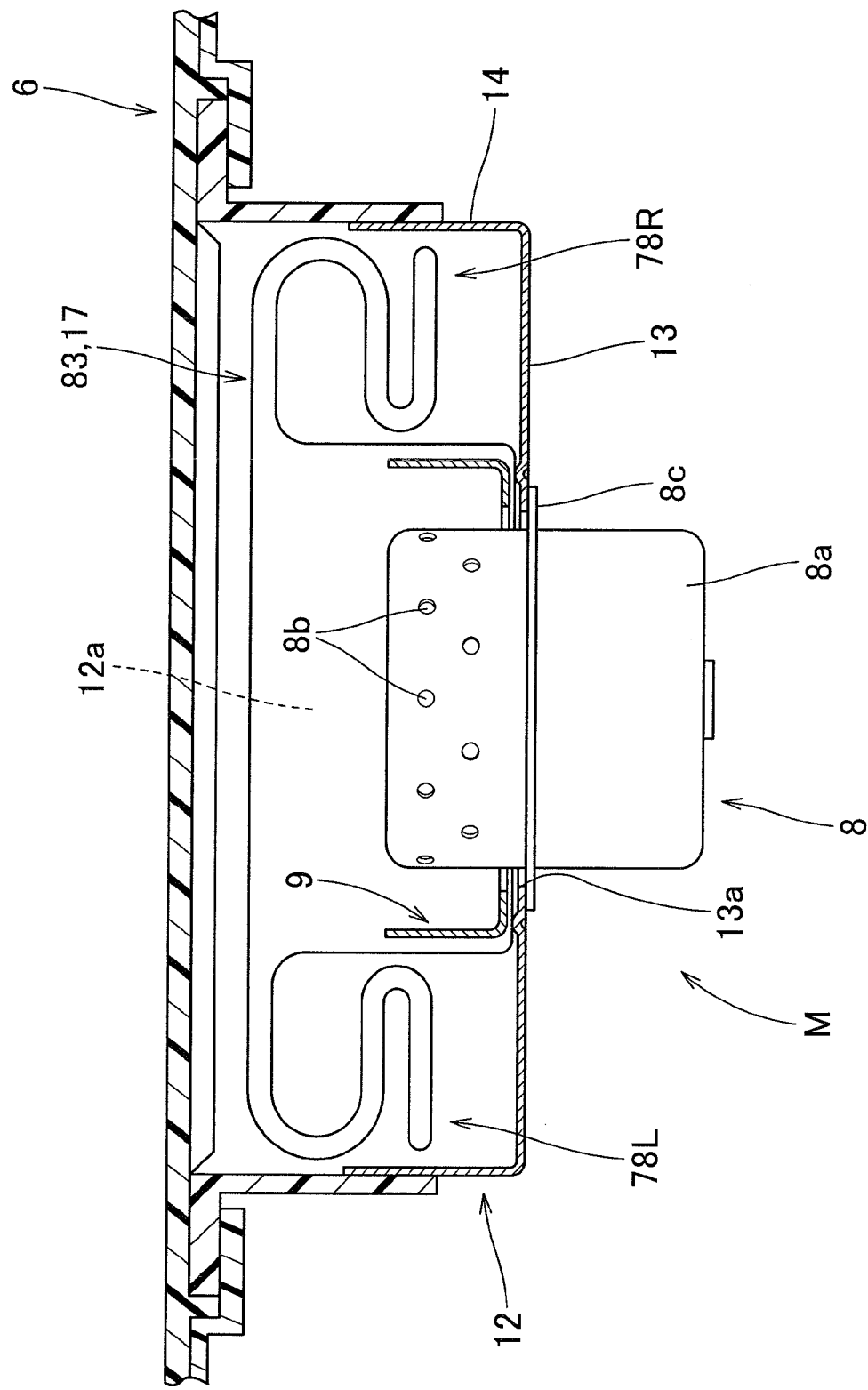
FIG. 2 is a schematic enlarged section of the airbag apparatus of FIG. 1 taken along a left and right direction, along line II-II of FIG. 1.
Figure 19:
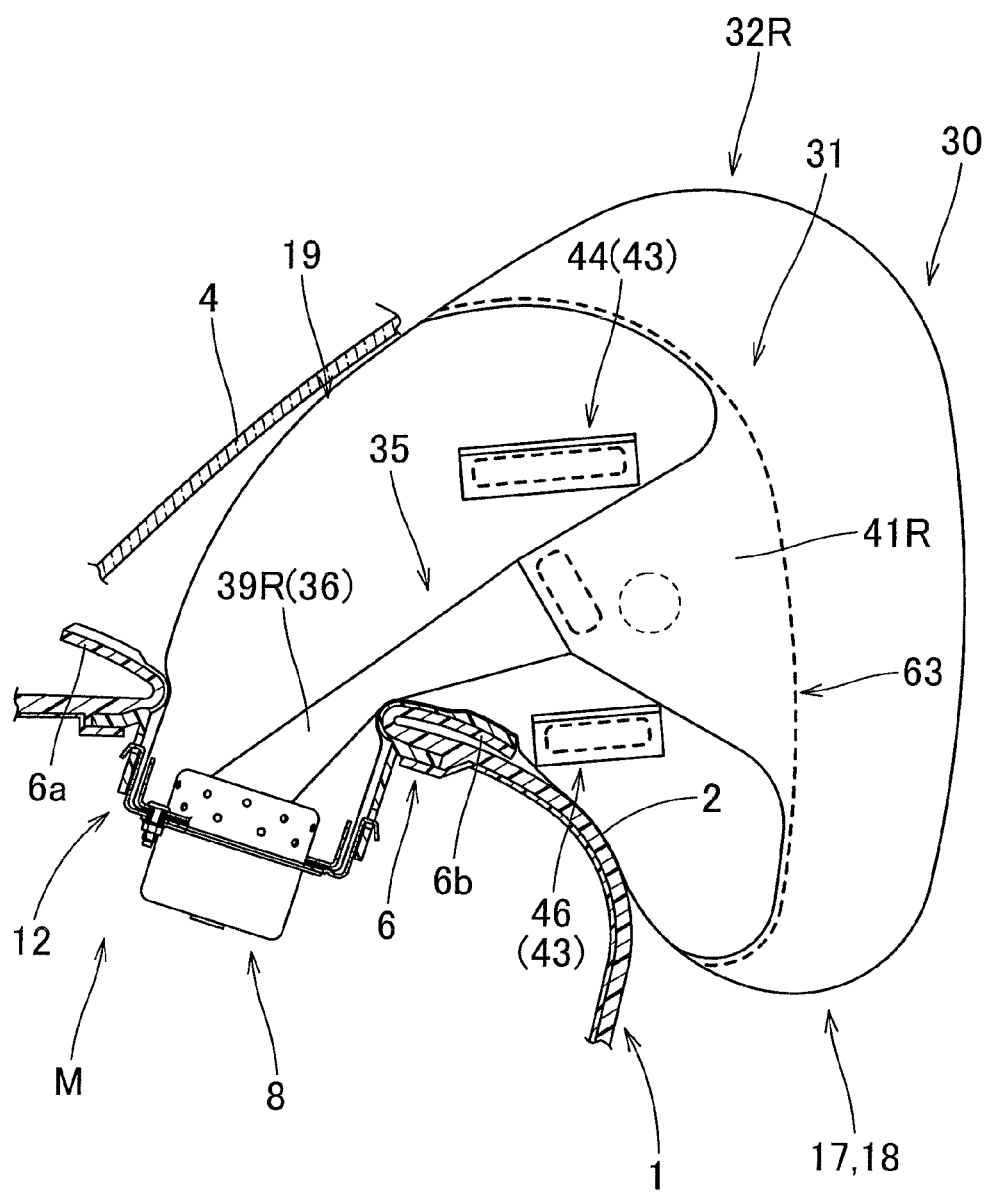
FIG. 19 is a schematic cross-sectional view of the airbag apparatus of the embodiment taken along a line passing in the front and rear direction as the airbag is deployed.

FIG. 1 shows an airbag apparatus M for a front passenger seat embodying the present invention. As shown in FIGS. 1 and 19, the airbag apparatus M is a top-mount airbag apparatus stored inside a top plane 2 of an instrument panel or dashboard 1. As shown in FIGS. 1 and 2, the airbag apparatus M includes an airbag 17, which is folded up, an inflator 8 for supplying the airbag 17 with an inflation gas, a case 12 for housing and holding the airbag 17 and inflator 8, a retainer 9 for attaching the airbag 17 and inflator 8 to the case 12 and an airbag cover 6 for covering the airbag 17.

The airbag cover 6 is integral with the dashboard 1 made from synthetic resin and includes two doors, i.e. front and rear doors 6a and 6b adapted to open when pushed by the airbag 17 upon airbag deployment (FIGS. 1 and 19). The airbag cover 6 further includes around the doors 6a and 6b a joint wall 6c, which is coupled to the case 12.

The inflator 8 includes a main body 8a that is generally columnar in shape and provided with gas discharge ports 8b, and a flange 8c for attachment to the case 12. As shown in FIGS. 1 and 2, the portion of the main body 8a located above the flange 8c is inserted into the airbag 17 via a later-described gas inlet port 25 and jointed with the airbag 17.

The case 12 is made of sheet metal into a generally box shape whose length direction extends along a left and right direction, and has a generally rectangular opening 12a at the top for allowing airbag emergence. As shown in FIGS. 1 and 2, the case 12 includes a bottom wall 13 located at the bottom to face the opening 12a and a circumferential wall 14 extending upward from the outer edge of the bottom wall 13 and retaining the joint wall 6c of the airbag cover 6. The bottom wall 13 includes at the center a generally round insert hole 13a which the inflator 8 is set in from the lower side. In a periphery of the insert hole 13a are apertures (reference numeral omitted) for receiving bolts 9a of the retainer 9 (FIG. 2). The airbag 17 and inflator 8 are attached to the bottom wall 13 of the case 12 by locating the retainer 9 inside the airbag 17 such that the bolts 9a go through the periphery of the gas inlet port 25 of the airbag 17, the bottom wall 13 of the case 12 and flange 8c of the inflator 8 and by fastening with nuts 10. Further, unillustrated brackets are provided on the bottom wall 13 for mounting on a vehicle body structure.

Referring to FIGS. 3 to 6, the airbag 17 includes a bag body 18, a vertical tether 35 and horizontal tethers 43 that are located inside the bag body 18 for controlling the shape of the bag body 18 as inflated.

As shown in FIGS. 1 and 19, the bag body 18 is designed to inflate into such a bag that fills up a space between the top plane 2 of the dashboard 1 and a windshield 4. More specifically, as shown in FIGS. 3 to 6, the bag body 18 is designed to inflate generally into a square conical contour whose top is at the front end of the bag body 18, and includes a passenger side wall 30 deployable to face a passenger and a circumferential wall 19 extending forward from the peripheral edge of the passenger side wall 30 while tapering and converging at the front end.

Figure 8:
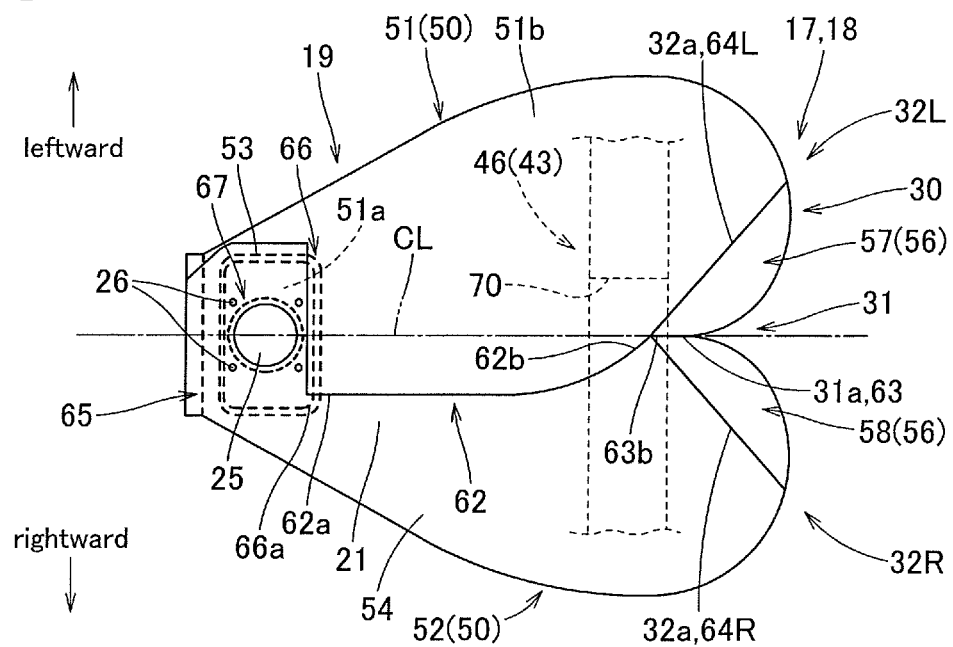
FIG. 8 is a bottom view of the airbag of FIG. 3.

The circumferential wall 19 is mainly so deployable as to fill up a space between the top plane 2 of the dashboard 1 and the windshield 4, and includes an upper side wall 20 and a lower side wall 21 extending generally along a left and right direction on upper and lower sides, and a left side wall 22 and a right side wall 23 extending generally along a front and rear direction at left and right sides. A generally round gas inlet port 25 is formed proximate the front end of the lower side wall 21, which location being proximate the front end of the bag body 18 at full deployment. The gas inlet port 25 serves to introduce an inflation gas and the main body 8a of the inflator 8 is set therein. As shown in FIG. 8, the gas inlet port 25 is formed at a generally center in a left and right direction of the lower side wall 21, and in a periphery of the inlet port 25 are a plurality of (four, in this embodiment) mounting holes 26 for receiving the bolts 9a of the retainer 9, which mount the periphery of the inlet port 25 on the bottom wall 13 of the case 12. Each one generally round vent hole 28 for releasing an extra inflation gas is formed respectively on the left side wall 22 and right side wall 23. In this specific embodiment, a peripheral area of each of the vent holes 28 is reinforced by a generally annular patch (reference numeral omitted).

Figure 3:
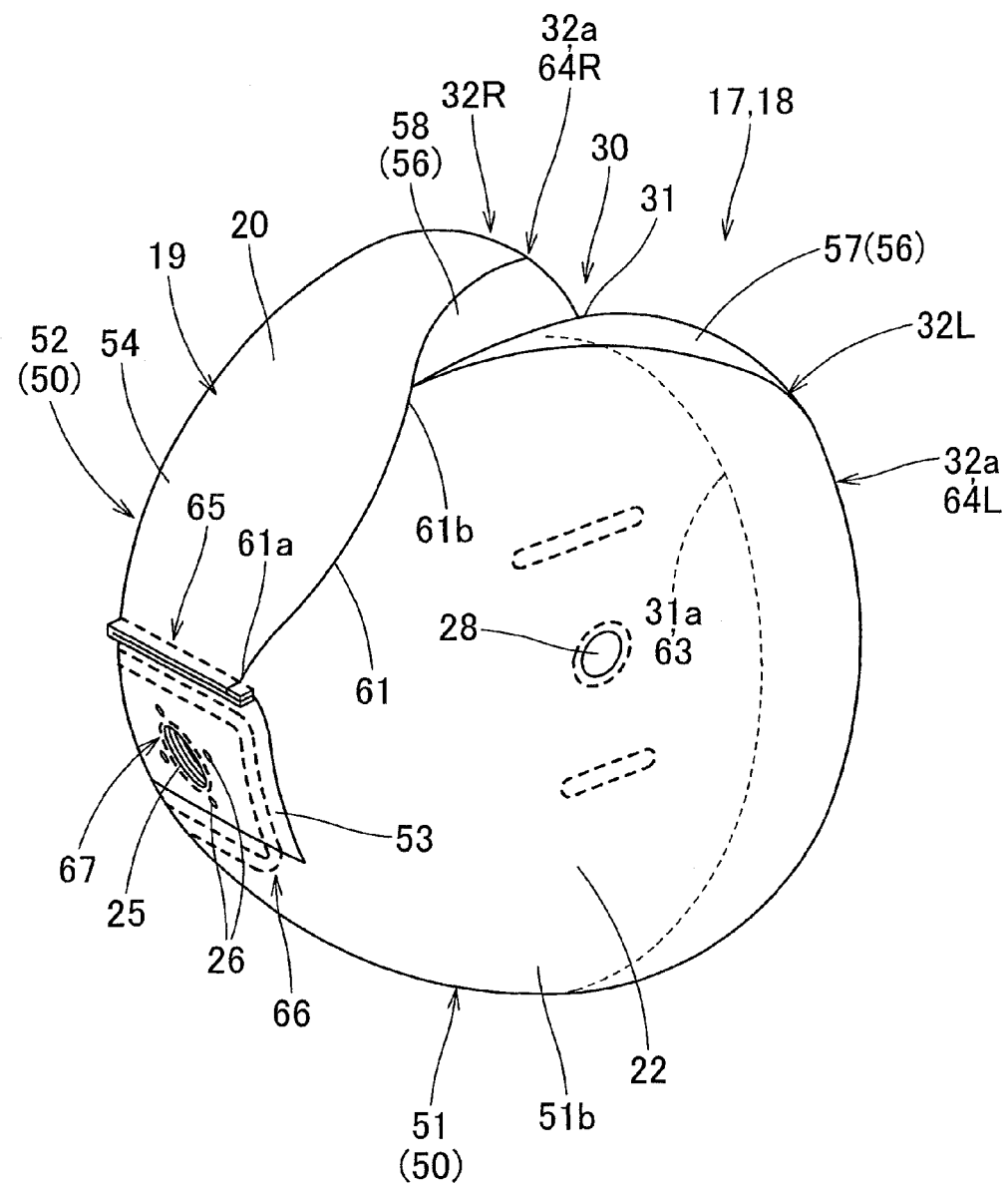
FIG. 3 is a perspective view of an airbag of the airbag apparatus of FIG. 1 as inflated by itself.
Figure 7:
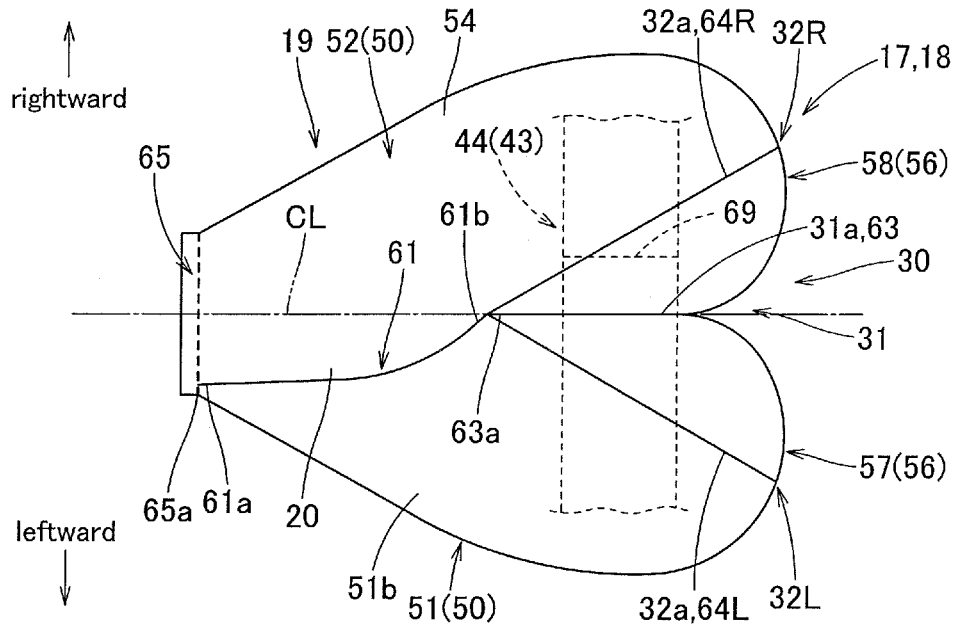
FIG. 7 is a plan view of the airbag of FIG. 3.

The airbag 17 includes on the upper side wall 20 and lower side wall 21 of the circumferential wall 19 an upper sewn portion (or upper seam) 61 and a lower sewn portion (or lower seam) 62, respectively, as shown in FIGS. 3, 7 and 8. The upper sewn portion 61 joints (or sews) an upper edge 51c of a later-described outer left panel 51 and an upper edge 54a of a later-described outer right panel 52 together whereas the lower sewn portion 62 joints (or sews) a lower edge 51d of the outer left panel 51 and a lower edge 54b of the outer right panel 52 together. The outer left panel 51 and right outer panel 52 are circumferential panels 50 for forming the circumferential wall 19. The upper sewn portion 61 extends forward from the recessed area 31 of the passenger side wall 30. In this specific embodiment, it continues from the upper end 63a of the inner sewn portion (inner seam) 63 which constitutes the bottom (or front end 31a) of the recessed area 31 on the passenger side wall 30. As shown in FIG. 7, as viewed from an up and down direction at full airbag inflation, the upper sewn portion 61 is slanted off a front and rear direction and its front end 61a is directed toward the left. More specifically, the rear end 61b region of the upper sewn portion 61 curves gently toward the left whereas the front end 61a region is a generally straight line extending obliquely relative to a front and rear direction and the front end 61a is going away from the center line CL, which extends through the center in a left and right direction, and is directed toward the left, in a slanted fashion. Moreover, as shown in FIGS. 3 and 7, the upper sewn portion 61 is arranged over a generally entire area in a front and rear direction of the upper side wall 20 and the front end 61a is jointed with the left end 65a of the front sewn portion 65 which constitutes the front end of the bag body 18.

Figure 4:
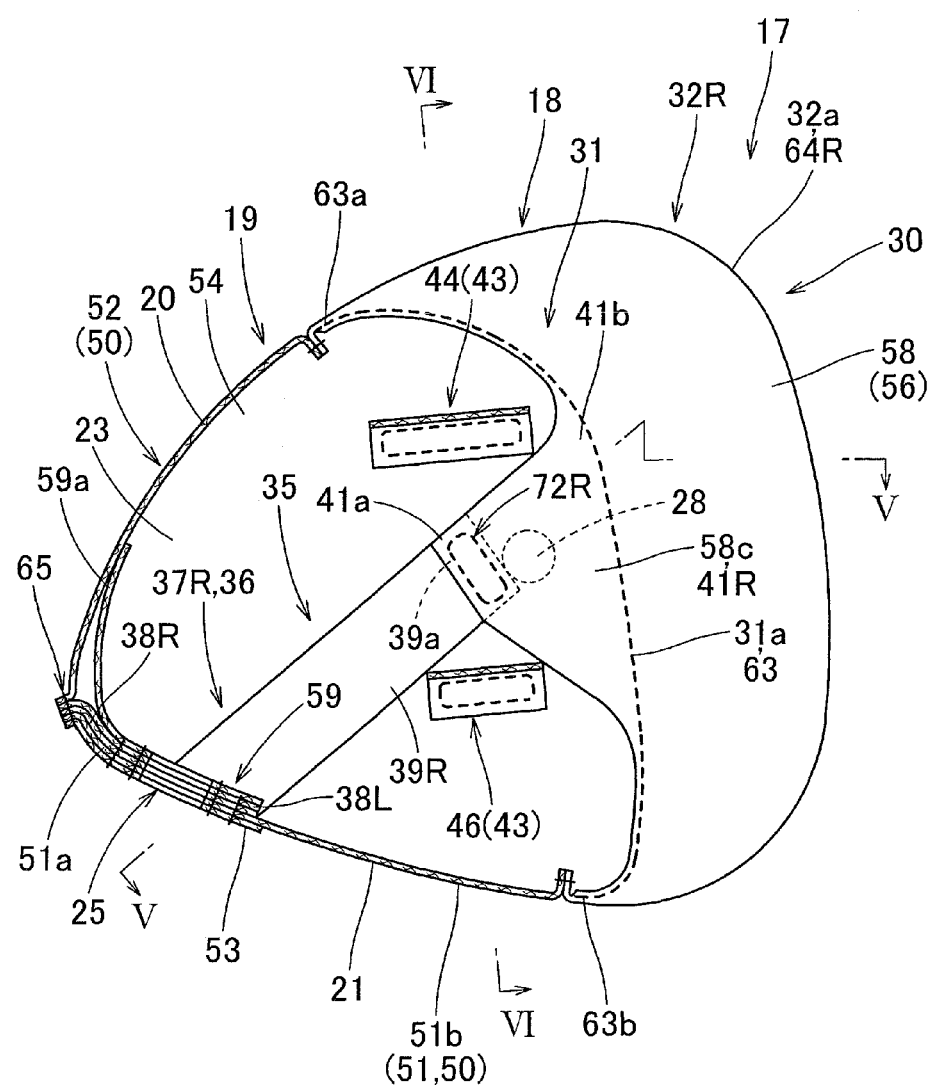
FIG. 4 is a schematic section of the airbag of FIG. 3 taken along a front and rear direction of a vehicle.

In a similar fashion to the upper sewn portion 61, the lower sewn portion 62 extends forward from the recessed area 31 in such a manner as to continue from the lower end 63b of the inner sewn portion (inner seam) 63 which constitutes the leading end or bottom of the recessed area 31 on the passenger side wall 30. As shown in FIG. 8, as viewed from an up and down direction at full airbag inflation, the lower sewn portion 62 is slanted off a front and rear direction and its front end 62a is directed toward the right, such that the front end 62a is located away from the front end 61a of the upper sewn portion 61 in a left and right direction. More specifically, the rear end 62b region of the lower sewn portion 62 curves gently toward the right whereas the front end 62a region is a generally straight line extending obliquely relative to a front and rear direction and the front end 62a is going away from the center line CL and is directed toward the right, in a slanted fashion. Moreover, as shown in FIG. 8, the lower sewn portion 62 is arranged over a generally entire area in a front and rear direction of the lower side wall 21 and the front end 62a is located proximate the right rear end 66a of the joint sewn portion 66 which joints the later-described front region 36 of the vertical tether 35 to the periphery of the gas inlet port 25. As shown in FIGS. 4, 7 and 8, the inner sewn portion 63 formed on the passenger side wall 30 is arranged generally along an up and down direction or a front and rear direction at full inflation of the airbag 17, and the upper sewn portion 61 and lower sewn portion 62 extending from the upper end 63a and lower end 63b of the inner sewn portion 63 are so arranged as not to intersect with each other when the airbag 17 is viewed from an up and down direction, such that the rear ends 61b and 62b generally coincide whereas the front ends 61a and 62a are apart from each other in a left and right direction.

Figure 5:
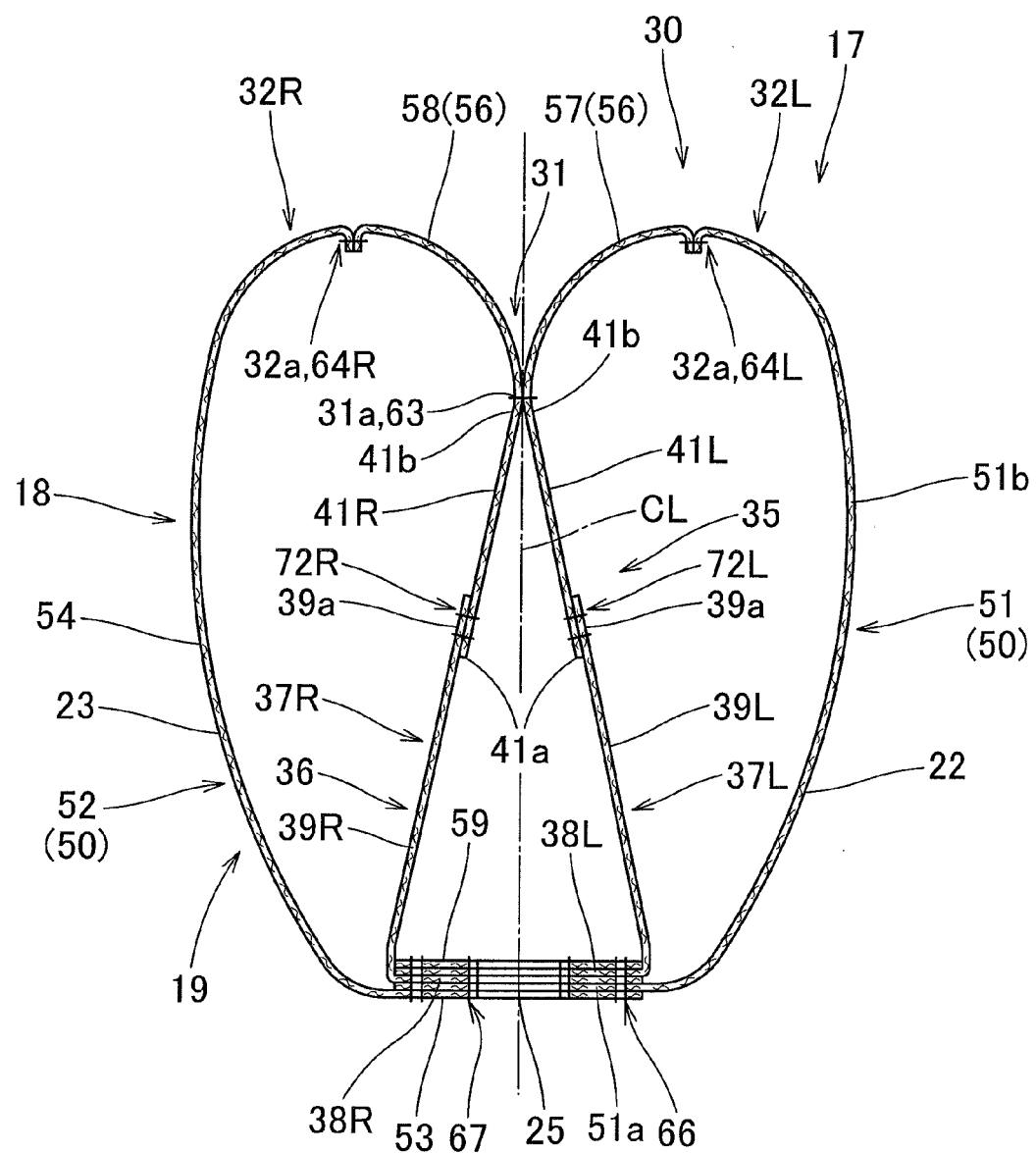
FIG. 5 is a schematic section taken along line V-V of FIG. 4.

The passenger side wall 30 is deployable generally vertically at the rear end of the bag body 18 in such a manner as to face a passenger seated in a front passenger seat. As shown in FIGS. 4 and 5, the passenger side wall 30 as inflated includes a recessed area 31 that is sunken forward and extends generally vertically generally at the center in a left and right direction. In this specific embodiment, the recessed area 31 extends over a generally entire area in an up and down direction of the passenger side wall 30. On the left and right sides of the recessed area 31 are raised regions 32L and 32R that protrude rearward relative to the recessed area 31. That is, at full airbag inflation, the recessed area 31, which is sunken at the center in a left and right direction, and the raised regions 32L and 32R, which are located on the left and right sides of the recessed area 31, extend continuously along an up and down direction of the passenger side wall 30 of the bag body 18 (FIGS. 4 and 5). More specifically, in this embodiment, this unevenness created by the recessed area 31 and raised regions 32L and 32R extends uniformly on the passenger side wall 30 and converges toward the gas inlet port 25 on the upper side wall 20 and lower side wall 21 of the circumferential wall 19. In this embodiment, the inner sewn portion (inner seam) 63 that sews inner circumferential edges 57b and 58b of a later-described inner left panel 57 and an inner right panel 58 together forms the leading end (or front end 31a) of the recessed area 31 whereas outer sewn portions 64L and 64R that respectively sew up each of rear edges 51e and 54c of the outer left panel 51 and outer right panel 52 and outer circumferential edges 57a and 58a of the inner left panel 57 and inner right panel 58 form tops 32a of the raised regions 32L and 32R (FIGS. 4 and 5).

Figure 9:
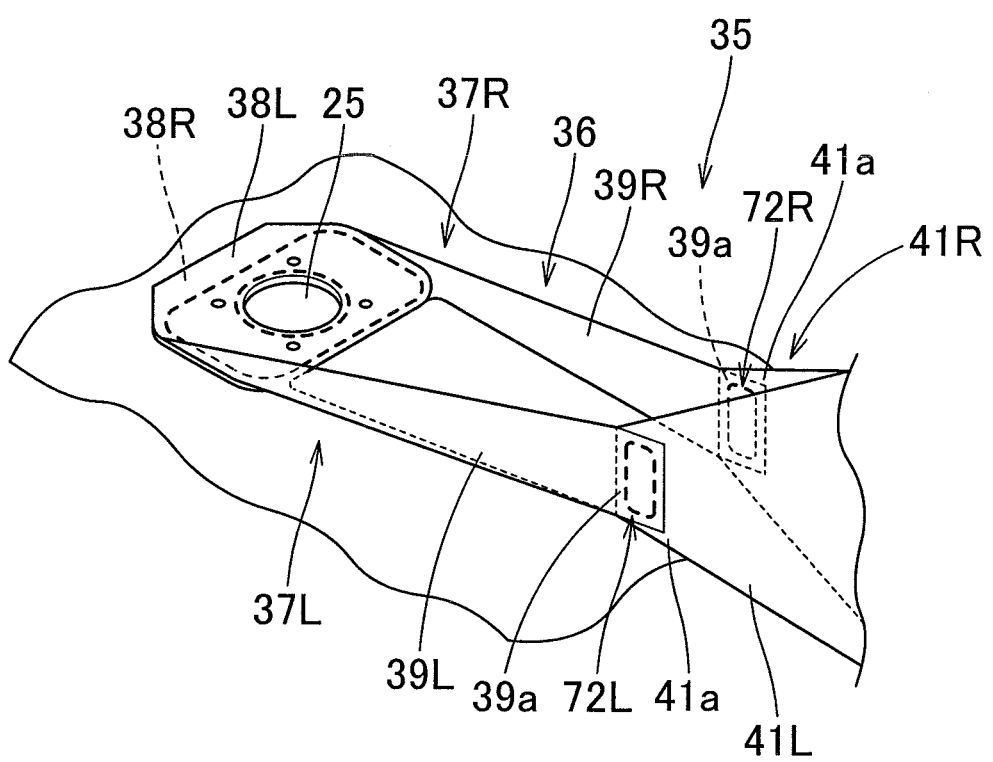
FIG. 9 is a partial enlarged schematic perspective view of a vertical tether of the airbag of FIG. 3.

The vertical tether 35 is made of a flexible sheet material and located inside the bag body 18 in order to pull the front end 31a of the recessed area 31 forward at airbag deployment. More specifically, as shown in FIGS. 4, 5 and 9, the vertical tether 35 of this embodiment includes a front section 36 deployable toward the circumferential wall 19 and rear sections 41L and 41R deployable toward the passenger side wall 30.

Figure 10:
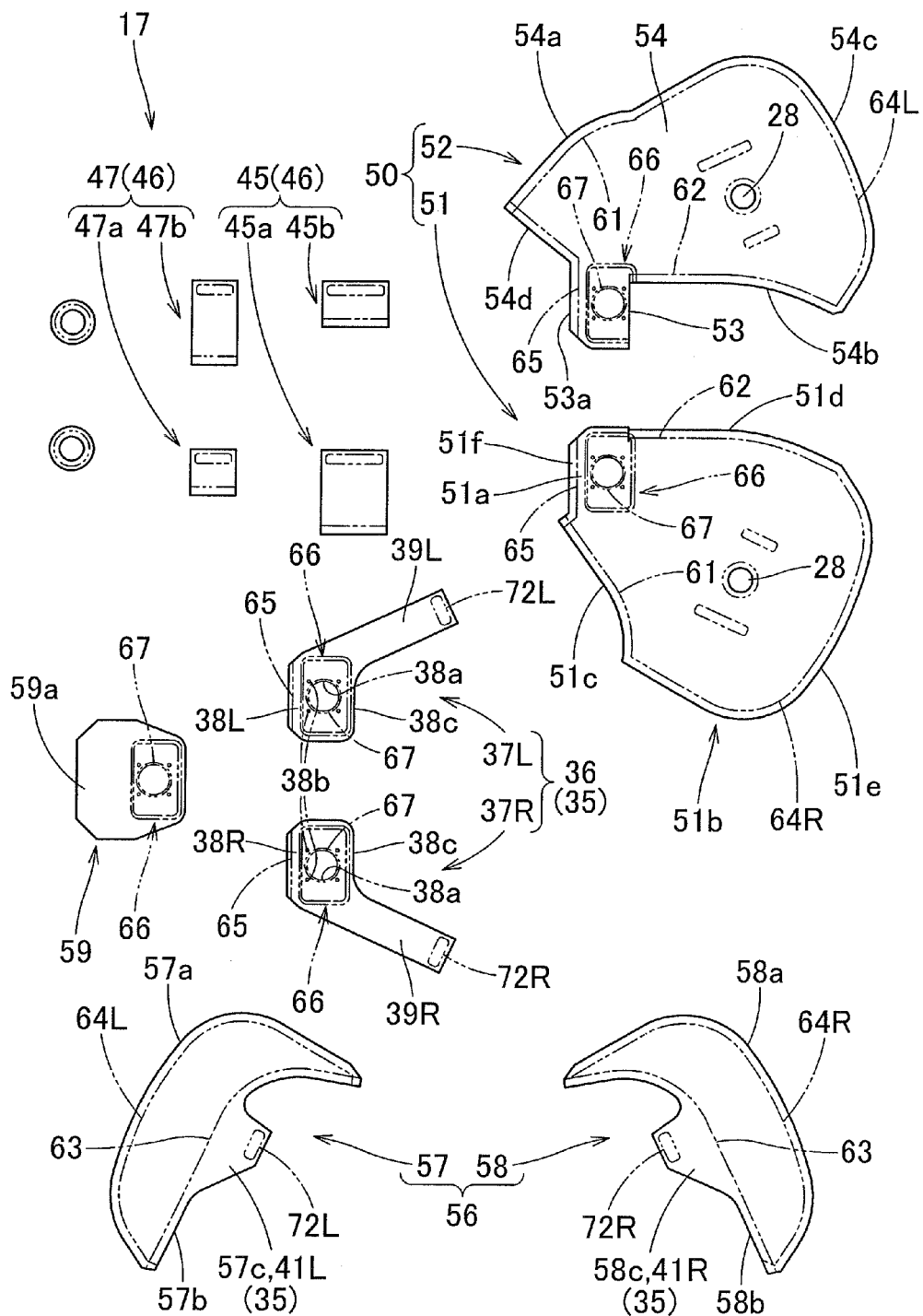
FIG. 10 depicts base cloths of the airbag of the embodiment by plan views.
Figure 12A:
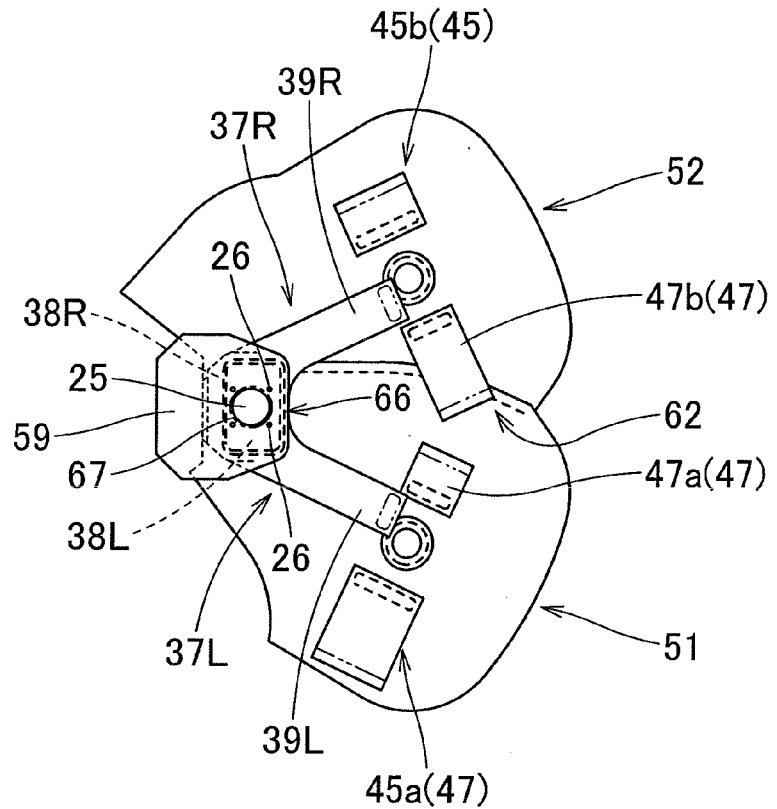
FIG. 12A schematically illustrates the manufacturing process of the airbag of the embodiment.

The front section 36 is formed into such a bifurcate band that extends from the left and right of the gas inlet port 25 toward the rear sections 41L and 41R in a bilaterally symmetric fashion relative to the gas inlet port 25. As shown in FIG. 10, the front section 36 is formed of a pair of base materials 37L and 37R, which are provided bilaterally symmetrical about the gas inlet port 25. Each of the base materials 37L and 37R includes a joint section 38L/38R jointed to the bag body 18 and a main body 39L/39R extending rearward from the joint section 38L/38R. Each of the joint sections 38L and 38R is formed into a generally rectangle whose length direction extends along a left and right direction, and includes at the center openings 38a and 38b which respectively correspond to the gas inlet port 25 and mounting holes 26. Each of the main bodies 39L and 39R is formed into a generally band extending rearward from the left edge or right edge of the joint section 38L/38R as the base materials 37L and 37R are flattened. The leading ends (rear ends) 39a are directed outwardly in a left and right direction, i.e., slanted off a front and rear direction. That is, when the base materials 37L and 37R are placed flatly such that the joint sections 38L and 38R overlap the periphery of the gas inlet port 25, the leading ends (rear ends) 39a of the main bodies 39L and 39R face away from each other in a left and right direction in a slanted fashion, as shown in FIG. 12A. The front section 36 is jointed to the lower side wall 21 by placing the joint sections 38L and 38R over the periphery of the gas inlet port 25 on the lower side wall 21 with the outer circumferences 38c coincided, and then sewing the joint sections 38L and 38R to the lower side wall 21 at the periphery of the gas inlet port 25 and in a vicinity of the outer circumferences 38c, with sewing threads, while forming sewn portions 66 and 67. The main bodies 39L and 39R are respectively jointed to front ends 41a of the rear sections 41 L and 41 R by the leading ends (rear ends) 39a, thereby forming sewn portions (or seams) 72L and 72R, as shown in FIGS. 5 and 9.

Two rear sections 41L and 41R are provided so as to correspond to the base materials 37L and 37R. As shown in FIGS. 4 and 5, each of the rear sections 41L and 41R is integral with the inner left panel 57/inner right panel 58 for forming the passenger side wall 30, respectively, and formed into a sheet extending from an inner circumferential edge 57b/58b of the inner left panel 57/inner right panel 58. More specifically, each of the rear sections 41L and 41R is formed into a generally trapezoid enlarging in an up and down direction from the front end 41a, which is jointed to the main body 39L/39R of the front section 36, toward the rear end 41 b, i.e., the inner circumferential edge 57b/58b of the inner left panel 57/inner right panel 58. Each of the rear sections 41L and 41R is integral with the inner left panel 57/inner right panel 58, in other words, extends directly from the inner sewn portion 63 sewing together the inner circumferential edges 57b and 58b of the inner left panel 57 and inner right panel 58. The sewn portions or seams 72L and 72R that joint the base material 37L of the front section and rear section 41L together and joint the base material 37R and rear section 41 R together are located at a distance from each other at airbag deployment.

Figure 6:
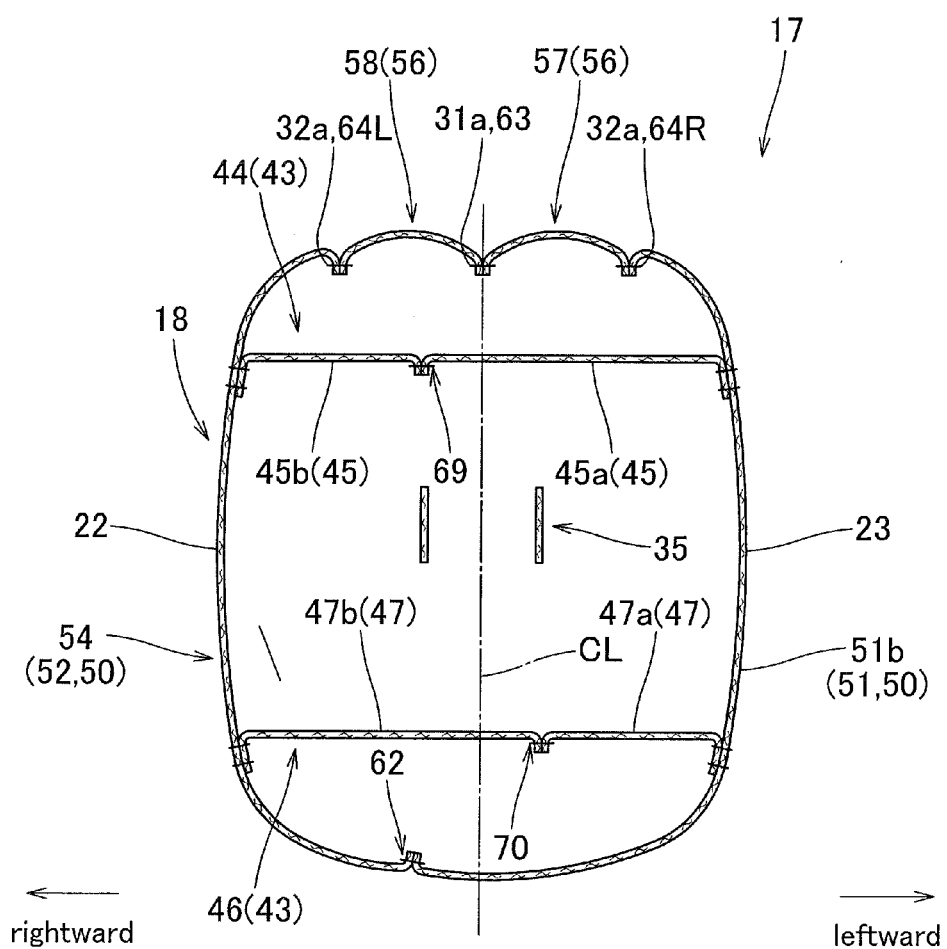
FIG. 6 is a schematic section taken along line VI-VI of FIG. 4.

Horizontal tethers 43 are so provided generally along a left and right direction as to connect the left side wall 22 and right side wall 23 together at airbag deployment. In this specific embodiment, the horizontal tethers 43 are located at two locations inside the bag body 18; above and below the vertical tether 35, as shown in FIGS. 4 and 6; an upper horizontal tether 44 located above the vertical tether 35 and a lower horizontal tether 46 located below the vertical tether 35. Both of the horizontal tethers 44 and 46 are formed into a generally band and extend generally along a horizontal direction at airbag deployment, and the upper horizontal tether 44 is greater in width than the lower horizontal tether (FIG. 4). Both of the horizontal tethers 44 and 46 are made by sewing or jointing ends of a pair of base materials 45/47 together, which base materials are fabricated of a flexible sheet material. In this specific embodiment, as shown in FIG. 6, members of the base materials 45/members of the base materials 47 are different in length from each other such that sewn portion or seams 69 and 70 that joints the base materials 45/base materials 47 together, respectively, are located on opposite side of the center line CL in a left and right direction. The widths of the horizontal tethers 44 and 46 are generally uniform over the entire length. The left section 45a of the base materials 45, which form the upper horizontal tether 44, is longer than the right section 45b, such that the sewn portion 69 sewing ends of the left section 45a and right section 45b is located to the right of the center line CL at airbag deployment. In contrast, the right section 47b of the base materials 47, which form the lower horizontal tether 46, is longer than the left section 47a, such that the sewn portion 70 sewing ends of the left section 47a and right section 47b is located to the left of the center line CL at airbag deployment. That is, the sewn portion (seam) 69 that joints ends of the base materials 45 for forming the upper horizontal tether 44 and the sewn portion (seam) 70 that joints ends of the base materials 47 for forming the lower horizontal tether 46 are located to the left or to the right relative to the inner sewn portion 63 (i.e., the center line CL), i.e., located on opposite sides of the inner sewn portion 63. Here, such horizontal tethers may also be formed of only one band-shaped base material without a seam, instead of split members. With the split configuration of this embodiment, however, the sewing work of connecting outer ends of the two split members to the left side wall and right side wall can be done before sewing base cloths together to form the circumferential wall 19, which is easier than an instance where the horizontal tether is made of only one base material. Thus it is preferable to form the horizontal tethers out of two split members.

The bag body 18 is formed by sewing together circumferential edges of predetermined shaped base cloths. As shown in FIG. 10, the bag body 18 of this specific embodiment is comprised of circumferential panels 50, which mainly constitute the circumferential wall 19, and passenger-side panels 56, which mainly constitute the passenger side wall 30. The circumferential panels 50 are comprised of an outer left panel 51 and an outer right panel 52. The passenger-side panels 56 are comprised of an inner left panel 57 and an inner right panel 58, which are formed in such a manner as to split the passenger side wall 30 into left and right.

As shown in FIG. 10, the outer left panel 51 and the outer right panel 52 constituting the circumferential panels 50 are formed in such a manner as to split the circumferential wall 19 into left and right, and formed into a generally sectorial contour, respectively. By jointing or sewing together the upper edges 51c and 54a, and the lower edges 51d and 54b, of the outer left panel 51 and the outer right panel 52, the outer left panel 51 and the outer right panel 52 are formed into the circumferential wall 19, which is generally tubular in shape. As described above, the upper sewn portion 61 jointing the upper edges 51c and 54a and the lower sewn portion 62 jointing the lower edges 51d and 54b are slanted off a front and rear direction, and therefore, the outer left panel 51 and the outer right panel 52 slightly differ from each other in outer contour.

The outer left panel 51 includes a root side section 51a for forming a peripheral area of the gas inlet port 25 and a leading end section 51b which extends from the root side section 51a toward the passenger-side panels 56 in a flaring fashion, and has a generally sectorial outer contour. The leading end section 51b constitutes the left side wall 22, a rear half of the left side region of the upper side wall 20, a front half of the left side region of the lower side wall 21, and a region of the passenger side wall 30 on the left side of the top 32a of the raised region 32L. The upper edge 51c of the outer left panel 51 forms the upper sewn portion 61, and is formed into a slightly receding curve corresponding to the curvature of the upper sewn portion 61. The lower edge 51d of the outer left panel 51 forms the lower sewn portion 62, and is formed into a slightly bulging curve corresponding to the curvature of the lower sewn portion 62.

The outer right panel 52 includes a generally sectorial main body 54 and a protruding section 53 protruding from the root portion of the main body 54 to form the peripheral area of the gas inlet port 25. The main body 54 constitutes the right side wall 23, a front half of the right side region of the upper side wall 20, a rear half of the right side region of the lower side wall 21, and a region of the passenger side wall 30 on the right side of the top 32a of the raised region 32R. The upper edge 54a of the main body 54 is formed into a slightly bulging curve corresponding to the curvature of the upper edge 51c of the outer left panel 51. The lower edge 54b of the main body 54 is formed into a slightly receding curve corresponding to the curvature of the lower edge 51d of the outer left panel 51. The rear edge 51e of the outer left panel 51 and the rear edge 54c of the main body 54 of the outer right panel 52 are generally identical in outer contour.

The inner left panel 57 and inner right panel 58 constitute a region of the passenger side wall 30 between the tops 32a of the raised regions 32L and 32R. More specifically, the panels 57 and 58 form a region of the bag body 18 ranging from the rear side of the upper side wall 20 in the circumferential wall 19 to an area of the passenger side wall 30 between the tops 32a of the raised regions 32L and 32R. The inner left panel 57 and inner right panel 58 are configured into a pair of bands each curving generally in a crescent shape such that each panel 57/58 forms the left/right half of the above-described region split up at the leading end or front end 31a of the recessed area 31. That is, the inner left panel 57 constitutes a region from the front end 31a of the recessed area 31 to the top 32a of the left raised region 32L whereas the inner right panel 58 constitutes a region from the front end 31a of the recessed area 31 to the top 32a of the right raised region 32R. In this specific embodiment, each of the inner left panel 57 and the inner left panel 58 is provided at the inner circumferential edge 57b/58b with an extended region 57c/58c that forms the rear section 41L/41 R of the vertical tether 35. In a flattened state, the outer circumferential edges 57a and 58a of the inner left panel 57 and inner right panel 58 are identical in curved shape to the rear edges 51e and 54c of the outer left panel 51 and outer right panel 52.

The bag body 18 further includes a reinforcing cloth 59 for reinforcing the peripheral area of the gas inlet port 25. As shown in FIGS. 4 and 5, the reinforcing cloth 59 is placed over the periphery of the gas inlet port 25 inside the bag body 18, on the joint sections 38L and 38R of the front section 36 of the vertical tether 35. The reinforcing cloth 59 includes an extended region 59a extending forward from the gas inlet port 25. As shown in FIG. 4, the extended region 59a covers an inner side of the front sewn portion 65 at airbag deployment and prevents an inflation gas fed from the gas inlet port 25 from hitting the front sewn portion 65 directly.

In this embodiment, members of the bag body 18 (i.e., the outer left panel 51, outer right panel 52, inner left panel 57 and inner right panel 58), the base materials 37L and 37R of the vertical tether 35, the base materials 45 and 47 of the horizontal tether 43 and the reinforcing cloth 59 are cut out of a base cloth for an airbag, which is a flexible woven fabric of polyester yarn, polyamide yarn or the like.

Manufacturing of the airbag 17 is now described. In advance, as shown in FIG. 13A, the inner left panel 57 and inner right panel 58 are overlaid one above the other with the outer circumferential edges 57a and 58a aligned, and the inner circumferential edges 57b and 58b are sewn together with sewing threads, thereby forming the inner sewn portion 63.

Figure 11A:
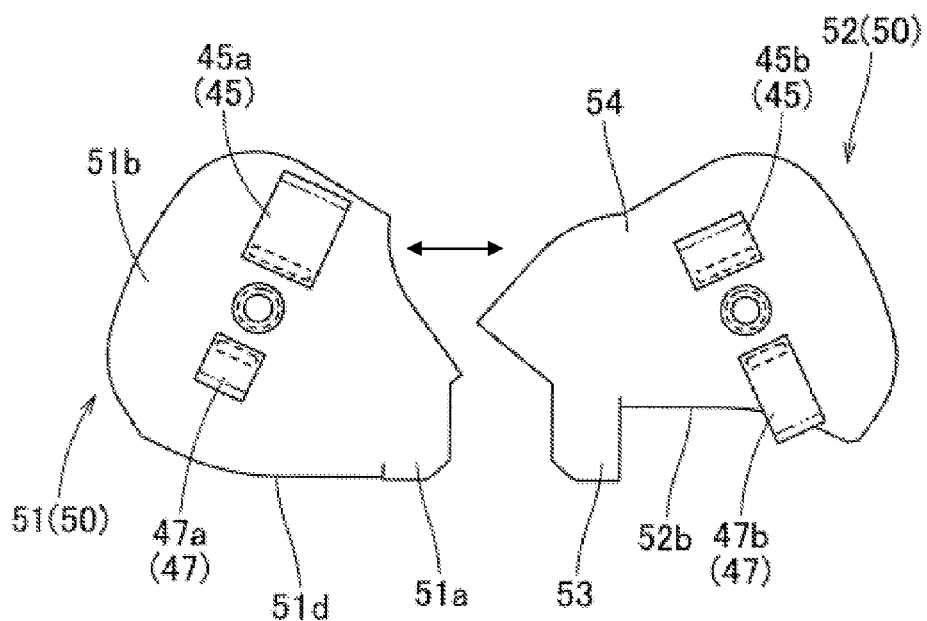
FIG. 11A schematically illustrates the manufacturing process of the airbag of the embodiment.
Figure 11B:
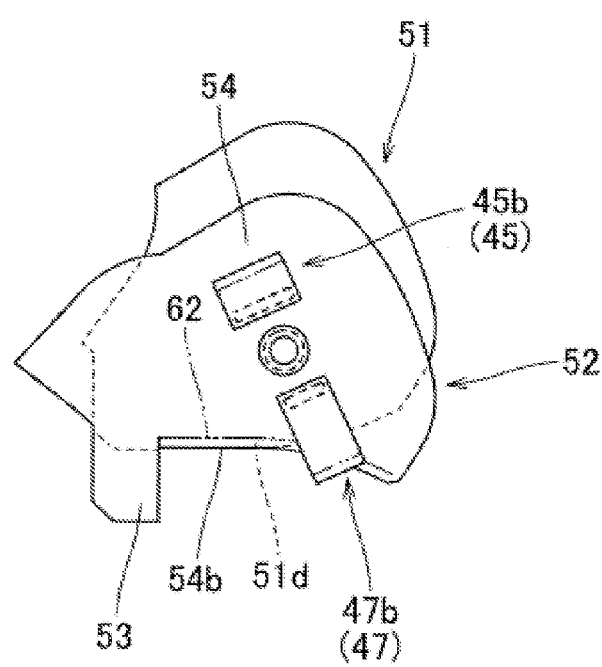
FIG. 11B schematically illustrates the manufacturing process of the airbag of the embodiment.

Firstly, as shown in FIG. 11A, a first end of the left section 45a of the base material 45 for the upper horizontal tether 44 and a first end of the left section 47a of the base material 47 for the lower horizontal tether 46 are sewn with sewing threads to the outer left panel 51. Likewise, a first end of the right section 45b of the base material 45 for the upper horizontal tether 44 and a first end of the right section 47b of the base material 47 for the lower horizontal tether 46 are sewn with sewing threads to the outer right panel 52. Then as shown in FIG. 11B, the outer left panel 51 and outer right panel 52 are overlaid one above the other with outer surfaces facing in and with front regions of the outer edges 51d and 54b matched, and then the outer edges 51d and 54b are sewn together with sewing threads thoroughly, thereby forming the lower sewn portion 62 (FIG. 12A).

Subsequently, as shown in FIG. 12A, the outer left panel 51 and outer right panel 52 are opened about the lower sewn portion 62, and the protruding section 53 of the outer right panel 52 is overlaid over the root side section 51a of the outer left panel 51. Further, the joint sections 38L and 38R of the base materials 37L and 37R of the front section 36 of the vertical tether 35 are overlaid over the protruding section 53 with the outer circumferential edges 38c, and then the reinforcing cloth 59 is overlaid over the joint sections 38L and 38R. Then these members are sewn together with sewing threads at the periphery of the gas inlet port 25 and at the outer circumferential edge 38c of the joint sections 38L and 38R, thereby forming the joint sewn portions 66 and 67. Thus the protruding section 53 and the root side section 51a are sewn together and the reinforcing cloth 59 and joint sections 38L and 38R of the front section 36 of the vertical tether 35 are jointed to the circumferential wall 19 at the same time. Thereafter, the gas inlet port 25 and mounting holes 26 are punched out as shown in FIG. 12A.

Figure 12B:
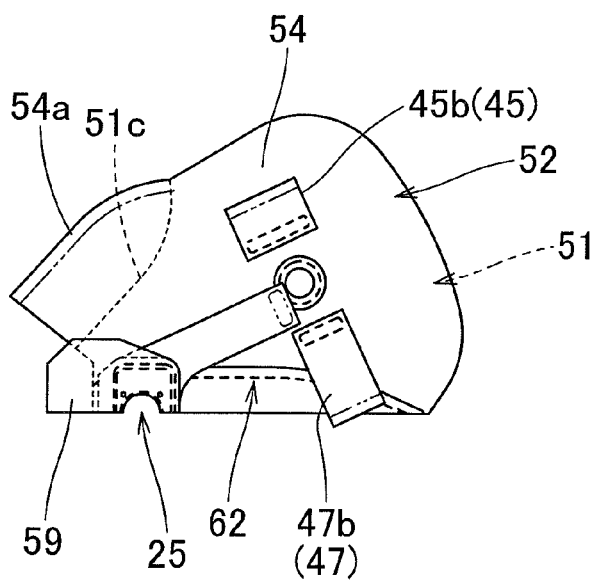
FIG. 12B schematically illustrates the manufacturing process of the airbag of the embodiment.
Figure 13A:
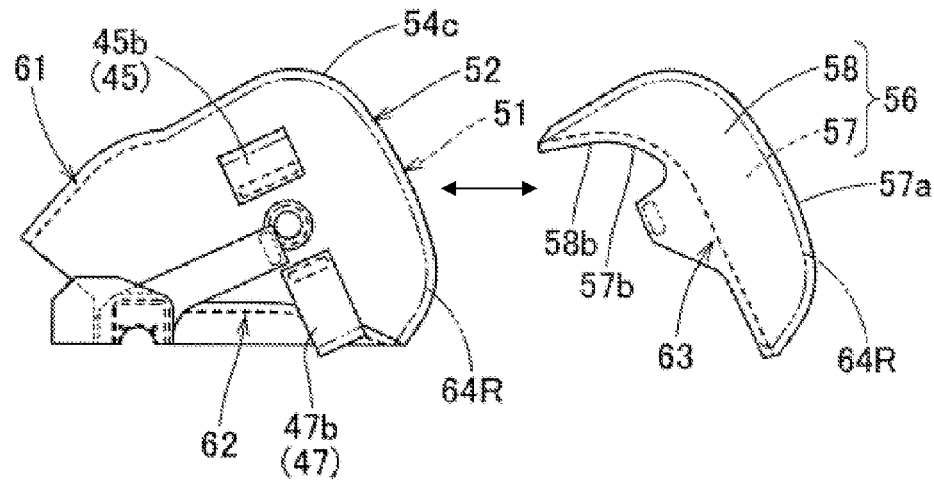
FIG. 13A schematically illustrates the manufacturing process of the airbag of the embodiment.
Figure 13B:
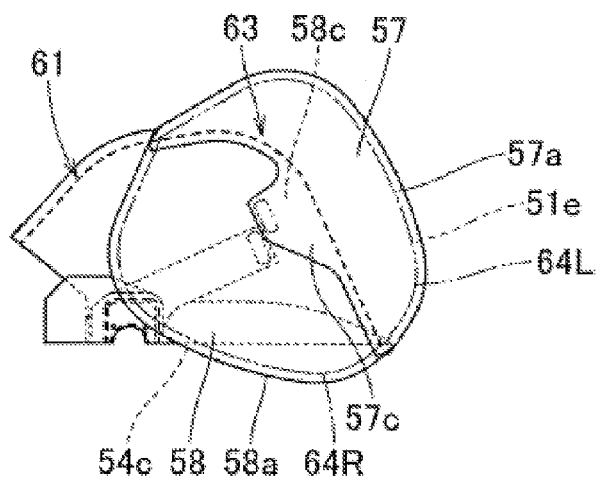
FIG. 13B schematically illustrates the manufacturing process of the airbag of the embodiment.

Then as shown in FIG. 12B, the outer left panel 51 and outer right panel 52 are folded back so the outer surfaces face in, and the upper edges 51c and 54a of the outer left panel 51 and outer right panel 52 are sewn together with sewing threads, thereby forming the upper sewn portion 61 (FIG. 13A). Thereafter, as shown in FIG. 13B, the outer left panel 51 and outer right panel 52 are so opened that the rear edges 51e and 54c are separated from each other, and the inner left panel 57 and inner right panel 58, which had been so opened as to separate the outer circumferential edges 57a and 58a from each other, are matched thereto. Then the outer circumferential edge 57a of the inner left panel 57 and the rear edge 51e of the outer left panel 51 are sewn together with sewing threads to form the outer sewn portion 64L, whereas the outer circumferential edge 58a of the inner right panel 58 and the rear edge 54c of the outer right panel 52 are sewn together with sewing threads to form the outer sewn portion 64R (FIG. 13B).

Figure 13C:
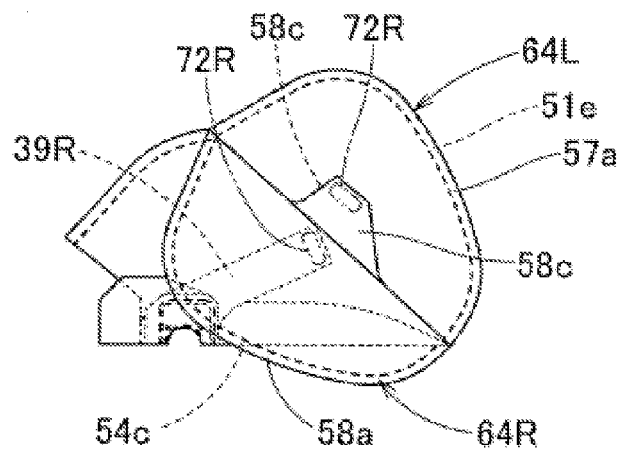
FIG. 13C schematically illustrates the manufacturing process of the airbag of the embodiment.
Figure 14A:
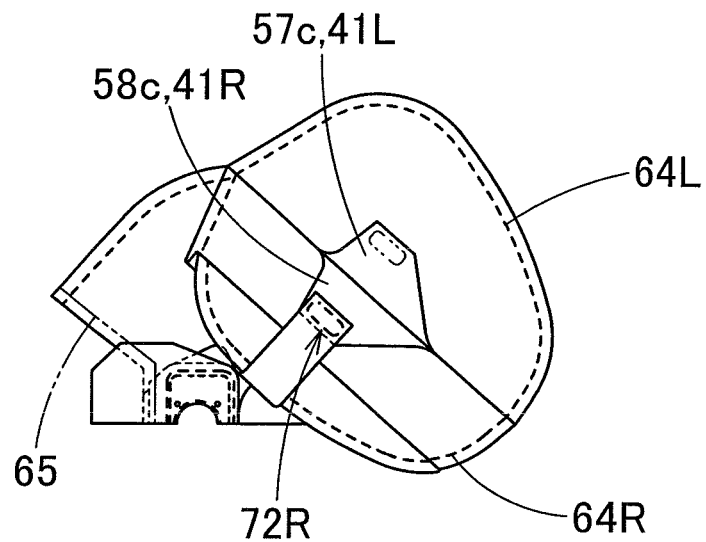
FIG. 14A schematically illustrates the manufacturing process of the airbag of the embodiment.
Figure 14B:
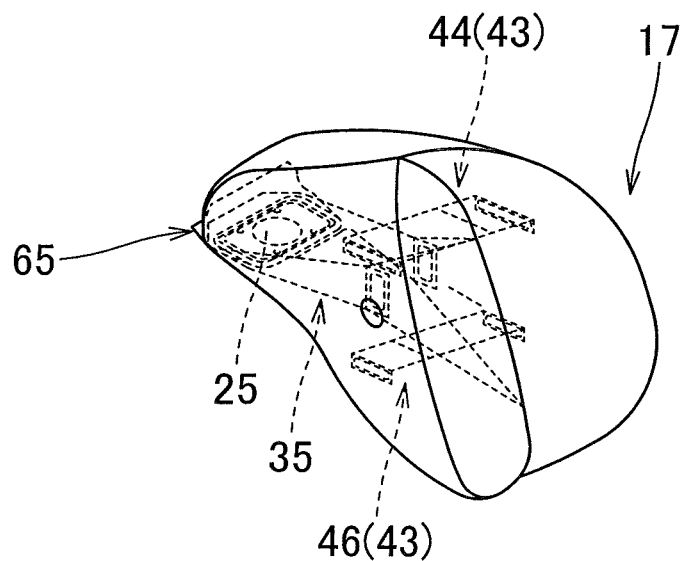
FIG. 14B schematically illustrates the manufacturing process of the airbag of the embodiment.

Thereafter, second ends of the left section 45a and right section 45b of the base materials 45 of the upper horizontal tether 44 are sewn together to form the sewn portion 69, thereby completing the upper horizontal tether 44. Likewise, second ends of the left section 47a and right section 47b of the base materials 47 of the lower horizontal tether 46 are sewn together to form the sewn portion 70, thereby completing the lower horizontal tether 46. Subsequently, as shown in FIGS. 13C and 14A, the main bodies 39L and 39R for forming the front section 36 of the vertical tether 35 and rear sections 41L and 41R are sewn together with sewing threads after mating corresponding rear ends 39a and front ends 41a, thereby forming the sewn portions 72L and 72R, and forming the vertical tether 35. Then the bag body 18 is reversed inside out from an unsewn region in the front end such that seam allowances may not appear outside. If then the front edge 51f of the outer left panel 51, the front edge 53a of the protruding section 53 of the outer right panel 52 and the front edge 54d of the main body 54 are sewn up with sewing threads to form the front sewn portion 65, the airbag 17 is completed as shown in FIG. 14B.

Figure 15:
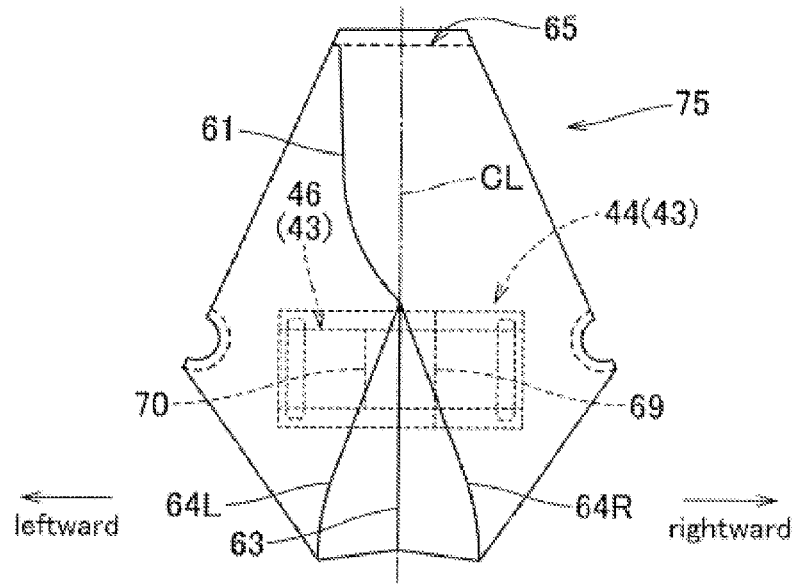
FIG. 15 is a plan view of a preparatorily-folded airbag.
Figure 16:
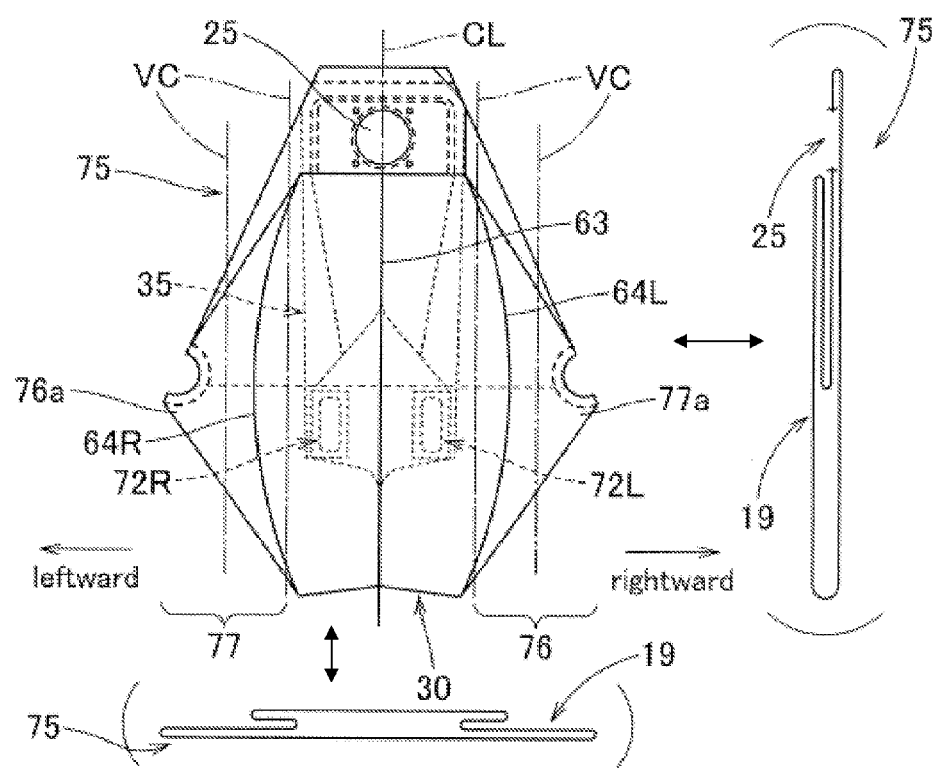
FIG. 16 is a bottom view of the preparatorily-folded airbag.

When the airbag 17 is completed, the retainer 9 is housed inside the airbag 17 such that the bolts 9a project out of the mounting holes 26, and then the airbag 17 is folded up. More specifically, as shown in FIGS. 15 and 16, the airbag 17 is firstly folded through a preparatory folding step, where the airbag is folded on creases extending in a left and right direction at predetermined positions such that a central area in an up and down direction of the passenger side wall 30 is spread out and flattened and the airbag is folded into a generally bilaterally symmetrical, generally flat shape. Then the airbag is folded through a left-right contraction step to fold the airbag on creases extending along a front and rear direction, and then a front-rear contraction step to fold the airbag on creases extending along a left and right direction. Thus the airbag 17 is reduced in size in front-and-rear, and left-and-right directions.

FIGS. 15 and 16 show a preparatorily-folded airbag 75, which has gone through the preparatory folding step. In the preparatorily-folded airbag 75, the inner sewn portion 63, which forms the front end 31*a* of the recessed area 31 in the passenger side wall 30 at airbag inflation, extends along a front and rear direction at the center in a left and right direction, and coincides with the center line CL. However, the upper sewn portion 61 and lower sewn portion 62 arranged on the circumferential wall 19 are slanted off a front and rear direction, such that the upper sewn portion 61 and lower sewn portion 62 intersect with the inner sewn portion 63 and overlap with the inner sewn portion 63 only partly. That is, the upper sewn portion 61 and lower sewn portion 62 do not overlap with the inner sewn portion 63 over a wide area in a front and rear direction. The sewn portions (or seams) 72L and 72R, which joint the main bodies 39L and 39R of the front section 36 of the vertical tether 35 and the rear sections 41L and 41R, are dislocated to the left and right relative to the inner sewn portion 63 so as not to overlap with the inner sewn portion 63, as shown in FIG. 16. Further, the sewn portion (seam) 69 of the upper horizontal tether 44 and the sewn portion (seam) 70 of the lower horizontal tether 46 are also dislocated to the left and right relative to the inner sewn portion 63 so as not to overlap with the inner sewn portion 63 (FIG. 15).

Figure 17A:
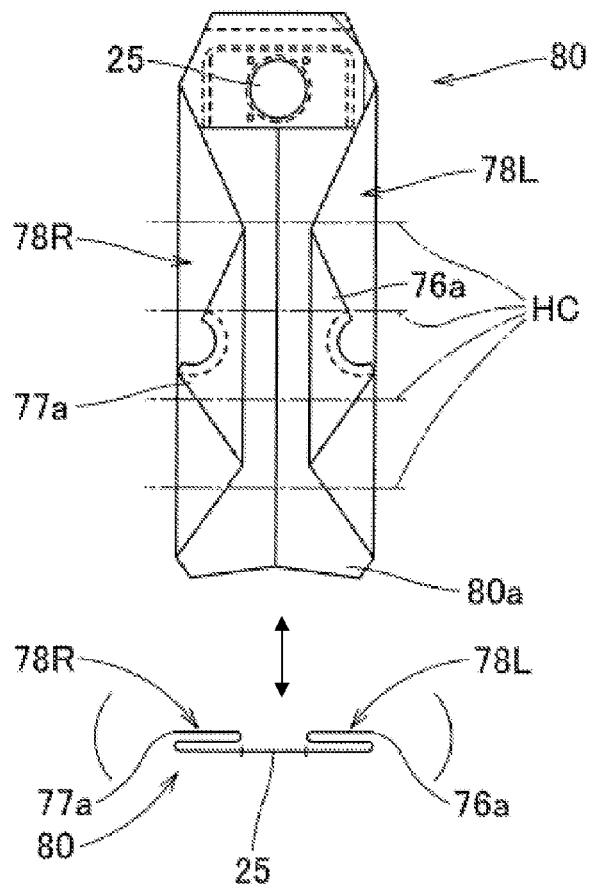
FIG. 17A depicts the folding process of the airbag.

In the left-right contraction step, a left side region 76 and a right side region 77 of the preparatorily-folded airbag 75, which are respectively located on the left and right of the gas inlet port 25, are folded in a bellows fashion on creases VC (FIG. 16) extending along a front and rear direction such that leading ends 76*a* and 77*a* face outwardly in a left and right direction and are placed on the side of the gas inlet port 25 (i.e., on the side of the circumferential wall 19). This folding provides bellows-folded portions 78L and 78R, and a left-right contracted airbag 80 shown in FIG. 17A.

Figure 17B:
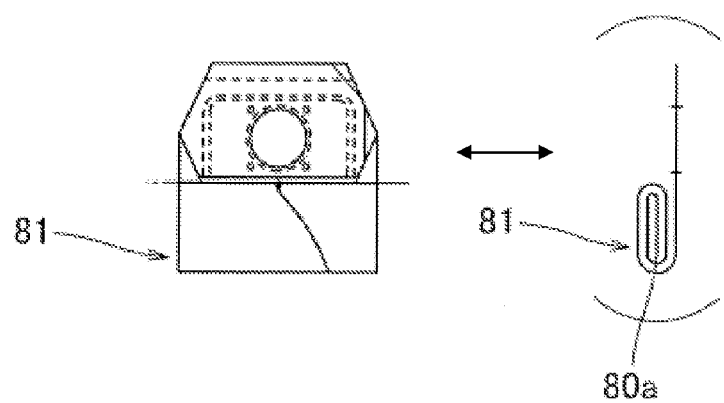
FIG. 17B depicts the folding process of the airbag.
Figure 18A:
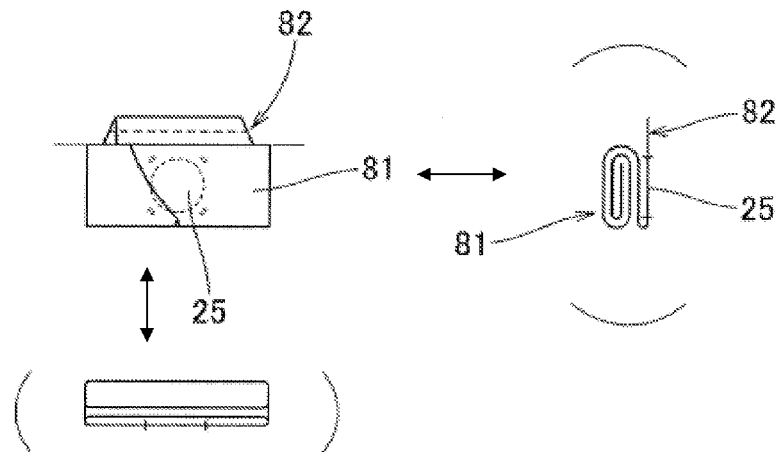
FIG. 18A depicts the folding process of the airbag.
Figure 18B:
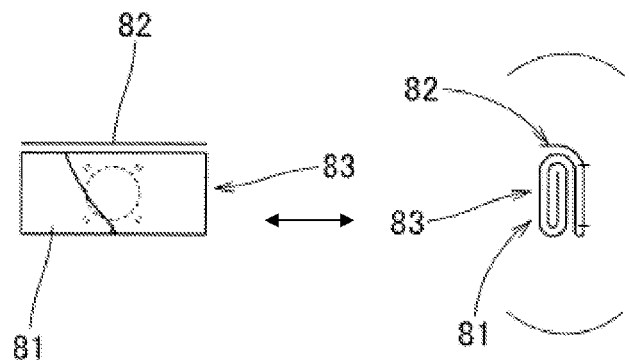
FIG. 18B depicts the folding process of the airbag.

In the following front-rear contraction step, the left-right contracted airbag 80 is rolled from the rear end 80*a* on the circumferential wall 19 on creases HC (FIG. 17A) extending along a left and right direction, thereby forming a rolled portion 81 (FIG. 17B). Then the rolled portion 81 is turned in an opposite direction and placed on the gas inlet port 25 as shown in FIG. 18A, and a front region 82, which is located in front of the gas inlet port 25, is so folded as to cover the front side of the rolled portion 81. Thus the folding of the airbag 17 is completed and there is provided a completely-folded body 83 as shown in FIG. 18B. In the completely-folded body 83, the bellows-folded portions 78L and 78R are dislocated from the gas inlet port 25, to the left and right.

The completely-folded body 83 is then wrapped up by a tearable wrapping sheet (not shown) for keeping the folded-up configuration. Then the airbag 17 (the completely-folded body 83) is placed on the bottom wall 13 of the case 12 such that the bolts 9*a* penetrate the bottom wall 13. Subsequently, the main body 8*a* of the inflator 8 is set in the case 12 from the lower side of the bottom wall 13, via the insert hole 13*a*, while the bolts 9*a* projecting downwardly from the bottom wall 13 are put through the flange 8*c* of the inflator 8. If then the bolts 9*a* projecting out of the flange 8*c* of the inflator 8 are fastened with nuts 10, the airbag 17 and the inflator 8 are mounted on the bottom wall 13 of the case 12.

Thereafter, the circumferential wall 14 of the case 12 is attached to the joint wall 6*c* of the airbag cover 6 on the dashboard 1, which has been mounted on a vehicle, and unillustrated brackets of the case 12 are secured to a vehicle body structure. Thus the airbag apparatus M is mounted on the vehicle.

Figure 20:
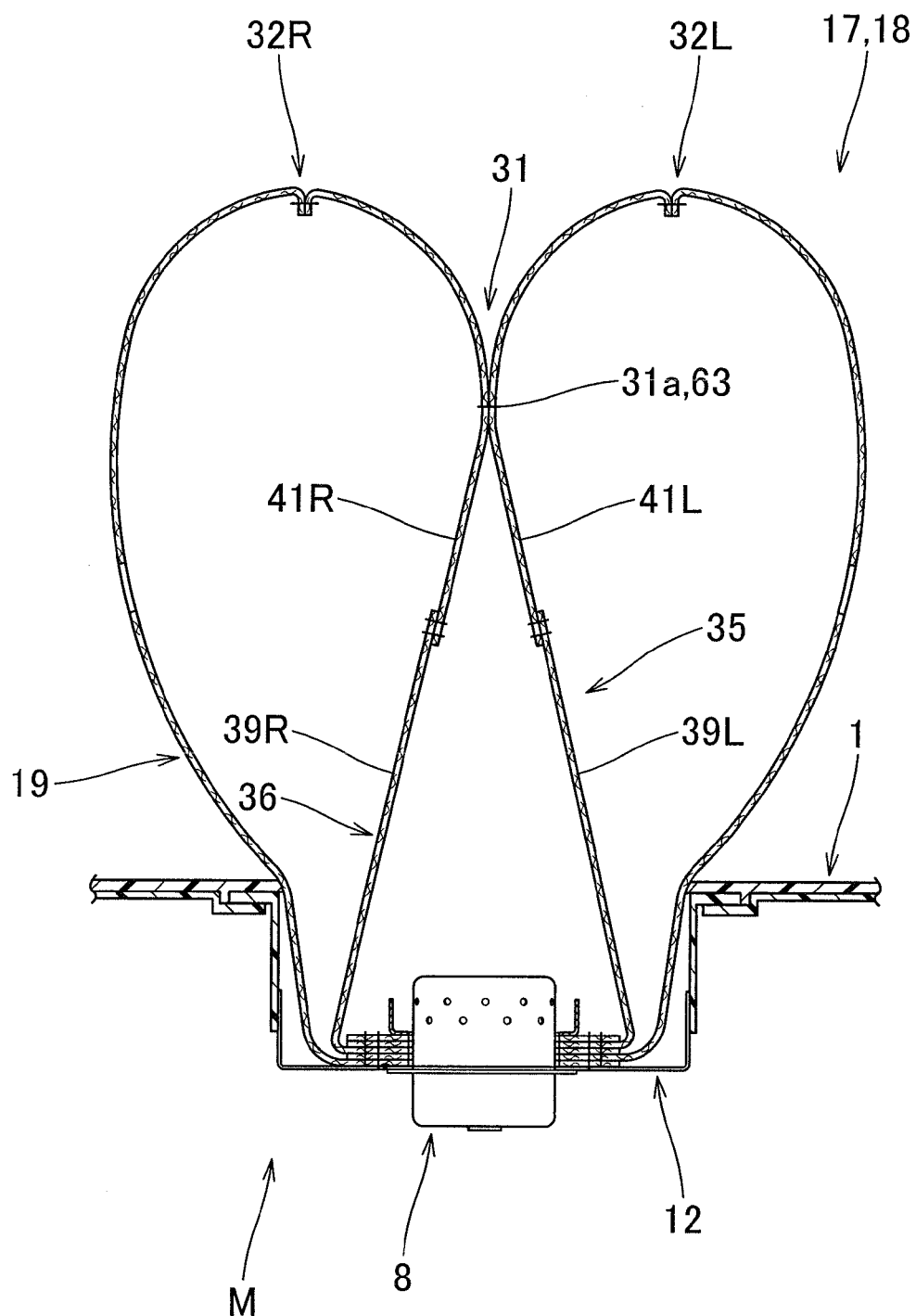
FIG. 20 is a schematic cross-sectional view of the airbag apparatus of the embodiment taken along a line passing in the left and right direction as the airbag is deployed.

After mounting the airbag apparatus M on the vehicle, in the event of a frontal collision of the vehicle, the inflator 8 discharges an inflation gas G from the gas discharge ports 8*b* to inflate the airbag 17. Then the airbag 17 pushes and opens the doors 6*a* and 6*b* of the airbag cover 6 as shown in FIG. 19. Then the airbag 17 protrudes upward from an opening formed by the opening of the doors 6*a* and 6*b*, and is deployed rearward as shown in FIGS. 19 and 20.

In the airbag apparatus M of this embodiment, although the seams (i.e., the upper sewn portion 61 and lower sewn portion 62), in an area of the circumferential wall 19, extend forward from the recessed area 31 of the passenger side wall 30, the seams are slanted off a front and rear direction. With this configuration, the upper sewn portion 61 and lower sewn portion 62 will be prevented from overlapping each other at the center in a left and rear direction of the airbag 17 when the airbag 17 is folded up to be reduced in width in a front and rear direction. Although the upper sewn portion 61 and lower sewn portion 62 are respectively accompanied by seam allowances comprised of hems of the outer left panel 51 and outer right panel 52, and the seam allowances extend continuously in a front and rear direction, this configuration will prevent a region at the center in a left and right direction of the airbag from being bulky when the airbag 17 is folded up. Thus the airbag 17 as folded up will be compact and will fit in a case with less height, and the airbag apparatus M can be mounted in a limited space.

Therefore, the airbag apparatus M for a front passenger seat of the embodiment is capable of being mounted in a limited space.

In the airbag apparatus M of the embodiment, especially, although the inner sewn portion 63, which forms the leading end or front end 31*a* of the recessed area 31, extends over an entire region in an up and down direction of the passenger side wall 30 continuously (in the preparatorily-folded airbag 75, the inner sewn portion 63 is arranged along a front and rear direction) as shown in FIGS. 7, 8, 15 and 16, both of the upper sewn portion 61 and lower sewn portion 62 are slanted off a front and rear direction as shown in FIGS. 7 and 8. This configuration will prevent the upper sewn portion 61 and lower sewn portion 62 from overlapping with the inner sewn portion 63 in the front-rear contraction step, and will consequently make the region at the center in a left and right direction of the airbag 17 as less bulky as possible when the airbag 17 is folded up. Further, although the airbag 17 is provided with the vertical tether 35 and horizontal tethers 43 for regulating the outer contour of the bag body 18 as inflated, the vertical tether 35 has no such a joint as to joint left and right regions, and is so configured as to bifurcate toward left and right and has a clearance therebetween. The sewn portions (or seams) 72L and 72R that joint (or sew together) the front section 36 and rear sections 41L and 41R of the vertical tether 35 do not run through the center line CL (or inner sewn portion 63) running through the center in a left and right direction, and are located separately on the left and right of the center line CL in the preparatorily-folded airbag 75 (FIG. 16). Although the horizontal tethers 43 are located above and below the vertical tether 35, each of the upper horizontal tether 44 and lower horizontal tether 46 is comprised of a pair of base materials 45/47, and the members of each pair of base materials 45/47 differ from each other in length. Therefore the sewn portions (or seams) 69 and 70 that joint the base materials 45 (the left section 45*a* and right section 45*b*) and base materials 47 (the left section 47*a* and right section 47*b*) are not located at the center in a left and right direction, but located to the left or to the right relative to the center line CL (i.e., the inner sewn portion 63) running through the center in a left and right direction, as shown in FIG. 16. As shown in FIG. 15, in the preparatorily-folded airbag 75 as well, the sewn portions 69 and 70 are dislocated to the left or to the right relative to the center line CL, on opposite sides of the center line CL. This configuration will prevent the sewn portion or seams 69, 70, 72L and 72R from overlapping with the inner sewn portion 63 when the airbag 17 is subjected to the front-rear contraction folding, and will consequently make the region at the center in a left and right direction of the airbag 17 as less bulky as possible when the airbag 17 is folded up.

Furthermore, in the circumferential wall 19 of the airbag apparatus M, the upper sewn portion (or upper seam) 61 located on the upper side wall 20 and the lower sewn portion (or lower seam) 62 located on the lower side wall 21 are both slanted off a front and rear direction such that the front end 61*a* of the upper sewn portion 61 and the front end 62*a* of the lower sewn portion 62 face away and separately located from each other in a left and right direction when the airbag 17 at full inflation is viewed from an up and down direction. With this configuration, although the upper sewn portion 61 and the lower sewn portion 62 are arranged continuously on the upper side and lower side of the circumferential wall 19, the folded-up airbag 17 has a limited region where the upper sewn portion 61 and lower sewn portion 62 overlap each other. Consequently, this configuration will make the region at the center in a left and right direction of the airbag 17 as less bulky as possible when the airbag 17 is folded up. In the airbag apparatus M, the circumferential panels 50 for constituting the circumferential wall 19 are formed of two base materials, the outer left panel 51 and outer right panel 52. With this configuration, a better fabric yield will be obtained than an instance where the circumferential wall is comprised of only one base material, and a manufacturing cost of the airbag 17 will be suppressed. Without considering such an advantage, the circumferential wall may be comprised of a piece of base material such that a sewn portion be located either on the upper side wall or on the lower side wall.

In the foregoing embodiment, the passenger side wall 30 of the airbag 17 is also formed of two base materials (the inner left panel 57 and inner right panel 58), and the front end 31*a* of the recessed area 31 is comprised of the inner sewn portion 63 that sew the inner circumferential edges 57*b* and 58*b* of the inner left panel 57 and inner right panel 58 together. However, an application of the present invention should not be limited thereby. By way of example, the present invention may also be applied to an airbag like the one illustrated in JP2008-62710, in which the passenger side wall is formed of a piece of base material. If, however, the passenger side wall 30 of an airbag is formed of two base materials (the inner left panel 57 and inner right panel 58), and the leading end or front end 31*a* of the recessed area 31 is comprised of the inner sewn portion 63, as in the airbag 17, a fabric yield will be better and a recessed state of the recessed area 31 will be steady at airbag inflation.

Although the foregoing embodiment has been described as applied to a top-mount passenger airbag apparatus, the present invention can be applied to a mid-mount passenger airbag apparatus as well.

What is claimed is:

1. An airbag apparatus adapted to be mounted on an instrument panel of a vehicle, the airbag apparatus comprising:
an airbag inflatable into a generally square conical contour whose top is at a front end of the airbag, the airbag including
a passenger side wall that is deployable generally vertically toward a front passenger seat at a rear end of the airbag,
a circumferential wall that extends forward from a peripheral edge of the passenger side wall while tapering and converges at the front end,
a gas inlet port that is located proximate the front end of and generally at a center in a left and right direction of the airbag at inflation for introducing an inflation gas, and
a recessed area that is sunken forward and extends vertically generally at a center in a left and right direction of the passenger side wall at airbag inflation, the airbag being mounted on a case by a periphery of the gas inlet port together with an inflator for feeding the inflation gas to the airbag, and being stored in the case while being folded up and reduced in size in front-and-rear and left-and-right directions, and
a seam that joints peripheral edges of a base material of the circumferential wall together to form the circumferential wall, the seam extending forward from the recessed area of the passenger side wall, the seam being slanted off a front and rear direction such that a front end of the seam is directed toward either left or right when the airbag at full inflation is viewed from an up and down direction, wherein
the circumferential wall is comprised of two of the base materials that are formed in such a manner as to split the circumferential wall into left and right,
the seam includes an upper seam and a lower seam that are both slanted off a front and rear direction such that a front end of the upper seam and a front end of the lower seam face away and are separately located from each other in a left and right direction when the airbag at full inflation is viewed from an up and down direction,
the front end of the upper seam slopes away from a center line, which extends through the center in a left and right direction, and
the front end of the lower seam slopes away from the center line.

2. The airbag apparatus according to claim 1, wherein:
the passenger side wall is comprised of the two base materials that are formed in such a manner as to split the passenger side wall into left and right; and
a leading end of a recess of the recessed area is comprised of an inner seam that joints peripheral edges of the base materials of the passenger side wall together.

3. The airbag apparatus according to claim 2, further comprising inside the airbag a vertical tether that is connected to the leading end of the recess of the recessed area and to the periphery of the gas inlet port and pulls the leading end of the recessed area forward at airbag deployment for regulating a shape of the airbag at deployment, the vertical tether comprising a front section that is deployable toward the circumferential wall and extends from the left and right of the gas inlet port in a bifurcated fashion, and two rear sections that are deployable toward the passenger side wall, each of which rear sections being jointed to bifurcated ends of the front section.

4. The airbag apparatus according to claim 3, wherein the two rear sections of the vertical tether are symmetrically connected to the bifurcated ends of the front section.

5. The airbag apparatus according to claim 3, wherein:
before the airbag is reduced in dimensions in front-and-rear and left-and-right directions to be housed in the case, the airbag is in a preparatorily-folded state where creases are formed on the circumferential wall such that the passenger side wall is spread out and flattened; and
in a preparatorily-folded state of the airbag, each of seams that joint ends of the front section and rear sections of the vertical tether is dislocated either to the left or to the right relative to the inner seam.

6. The airbag apparatus according to claim 5, further comprising inside the airbag a horizontal tether that is arranged along a left and right direction and connects a left side wall and a right side wall of the circumferential wall, the horizontal tether being made by jointing ends of a pair of base materials that are split up into left and right and a seam that joints the base materials of the horizontal tether together being dislocated either to the left or to the right relative to the center in a left and right direction of the airbag at inflation.

7. The airbag apparatus according to claim 6, wherein:
the horizontal tether comprises an upper horizontal tether deployable above the vertical tether
and a lower horizontal tether deployable below the vertical tether;
each of the upper horizontal tether and the lower horizontal tether is made by jointing ends of a pair of base materials that are split up into left and right; and
a seam that joints the base materials of the upper horizontal tether and a seam that joints the base materials of the lower horizontal tether are dislocated to the left and to the right relative to the inner seam and located on opposite sides of the inner seam at airbag inflation.

8. The airbag apparatus according to claim 1, wherein the front end of the upper seam and the front end of the lower seam gradually curve away from the center line.

* * * * *